US012706228B2

(12) United States Patent
Nakano et al.

(10) Patent No.: US 12,706,228 B2
(45) Date of Patent: Aug. 11, 2026

(54) WIRING SYSTEM

(71) Applicant: Sumitomo Wiring Systems, Ltd., Mie (JP)

(72) Inventors: Haruka Nakano, Mie (JP); Masaki Mizushita, Mie (JP); Yuya Fukami, Mie (JP); Jun Yamasaki, Mie (JP); Hitomi Nagasawa, Mie (JP); Motohiro Yokoi, Mie (JP)

(73) Assignee: SUMITOMO WIRING SYSTEMS, LTD., Mie (JP)

(*) Notice: Subject to any disclaimer, the term of this patent is extended or adjusted under 35 U.S.C. 154(b) by 157 days.

(21) Appl. No.: 18/707,679

(22) PCT Filed: Nov. 10, 2022

(86) PCT No.: PCT/JP2022/041819
§ 371 (c)(1),
(2) Date: May 6, 2024

(87) PCT Pub. No.: WO2023/095621
PCT Pub. Date: Jun. 1, 2023

(65) Prior Publication Data

US 2025/0006401 A1 Jan. 2, 2025

(30) Foreign Application Priority Data

Nov. 25, 2021 (JP) ................................ 2021-191098

(51) Int. Cl.
*H01B 7/00* (2006.01)

(52) U.S. Cl.
CPC ........... *H01B 7/0045* (2013.01); *H01B 7/009* (2013.01)

(58) Field of Classification Search
CPC .... B60R 6/0207; B60R 6/0215; H01B 7/0045
See application file for complete search history.

(56) References Cited

U.S. PATENT DOCUMENTS 5,971,799 A * 10/1999 Swade .................. H01R 27/02 439/502
6,504,262 B1 * 1/2003 Aoki .................. B60R 16/0207 307/9.1

(Continued)

FOREIGN PATENT DOCUMENTS

JP 8-129911 A 5/1996
JP 2002-298655 A 10/2002

(Continued)

OTHER PUBLICATIONS

English translation of International Search Report in International Patent Application No. PCT/JP2022/041819, dated Jan. 24, 2023.

(Continued)

*Primary Examiner* — Paresh Paghadal
(74) *Attorney, Agent, or Firm* — Greenblum & Bernstein, P.L.C.

(57) ABSTRACT

A wiring system includes: a main wire-side wiring member including a plurality of main wire-side circuits and a plurality of main wire-side connectors, the plurality of main wire-side circuits bundled in a form with a plurality of connection ends; and a terminal-side wiring member including a terminal-side connector connected to any one of the plurality of main wire-side connectors and a terminal-side circuit connected to the terminal-side connector, wherein the plurality of main wire-side connectors include an extra-thin electrical wire connector, the plurality of main wire-side circuits include a plurality of extra-thin electrical wire connector connection circuits connected to the extra-thin electrical wire connector, and the plurality of extra-thin electrical wire connector connection circuits include an extra-thin electrical wire having a conductor cross-sectional area of 0.13 sq or less as an extra-thinnest electrical wire having a smallest conductor cross-sectional area.

6 Claims, 7 Drawing Sheets

(56) References Cited

U.S. PATENT DOCUMENTS

| | | | | |
|---|---|---|---|---|
| 10,683,974 | B1 * | 6/2020 | Chen | F21S 4/22 |
| 11,718,248 | B2 * | 8/2023 | Murata | B60R 16/023 174/72 A |
| 12,482,578 | B2 * | 11/2025 | Arai | B60R 16/0215 |
| 2005/0222566 | A1 * | 10/2005 | Nakahira | A61B 18/14 606/49 |
| 2009/0095501 | A1 * | 4/2009 | Toyama | H01B 9/003 174/113 R |
| 2009/0186507 | A1 * | 7/2009 | Watanabe | H01R 4/185 439/282 |
| 2014/0209345 | A1 * | 7/2014 | Minadeo | H01R 4/72 174/84 R |
| 2015/0349471 | A1 | 12/2015 | Maki et al. | |
| 2017/0194722 | A1 * | 7/2017 | Naganishi | H01R 11/09 |
| 2018/0219310 | A1 * | 8/2018 | Lukofsky | H01R 12/52 |
| 2018/0342334 | A1 | 11/2018 | Sugimoto et al. | |
| 2019/0074641 | A1 | 3/2019 | Maki et al. | |
| 2021/0225555 | A1 | 7/2021 | Mizushita et al. | |
| 2023/0085407 | A1 * | 3/2023 | Murata | B60R 16/0215 174/72 A |

FOREIGN PATENT DOCUMENTS

| | | | |
|---|---|---|---|
| JP | 2004-175266 | A | 6/2004 |
| JP | 2013-45529 | A | 3/2013 |
| JP | 2016-015809 | A | 1/2016 |
| JP | 2017-152102 | A | 8/2017 |
| WO | WO2020/121463 | A1 | 6/2020 |

OTHER PUBLICATIONS

Office Action in counterpart Japanese Application No. 2021-191098, dated Mar. 11, 2025, and English translation thereof.

* cited by examiner

WIRING SYSTEM

TECHNICAL FIELD

The present disclosure relates to a wiring system.

BACKGROUND ART

Patent Document 1 discloses a configuration that a connector is provided to a branch destination of a main wire harness and the other harness connected to an in-vehicle apparatus is connector-connected to the connector of the branch destination.

The similar configuration is disclosed in Patent Documents 2 to 4.

PRIOR ART DOCUMENTS

Patent Document(s)

Patent Document 1: Japanese Patent Application Laid-Open No. 2004-175266

Patent Document 2: international Publication No. WO2020/121463A1

Patent Document 3: Japanese Patent Application Laid-Open No. 2016-15809

Patent Document 4: Japanese Patent Application Laid-Open No. 2017-152102

SUMMARY

Problem to be Solved by the Invention

It is desired to use an extra-thin electrical wire having a small conductor cross-sectional area from a viewpoint of reducing cost and weight. In the meanwhile, there is a limitation on the extra-thin electrical wire regarding an application position from a viewpoint of tensile strength and impact strength.

Accordingly, an object of the present disclosure is to widen an application position of an extra-thin electrical wire.

Means to Solve the Problem

A wiring system according to the present disclosure is a wiring system including: a main wire-side wiring member including a plurality of main wire-side circuits and a plurality of main wire-side connectors, the plurality of main wire-side circuits bundled in a form with a plurality of connection ends, and the plurality of main wire-side connectors connected to the plurality of connection ends, respectively; and a terminal-side wiring member including a terminal-side connector connected to any one of the plurality of main wire-side connectors and at least one terminal-side circuit connected to the terminal-side connector, the terminal-side connector connected to any one of the plurality of main wire-side connectors so that the terminal-side circuit is electrically connected to at least some of the plurality of main wire-side circuits, wherein the plurality of main wire-side connectors include an extra-thin electrical wire connector, the plurality of main wire-side circuits include a plurality of extra-thin electrical wire connector connection circuits connected to the extra-thin electrical wire connector, and the plurality of extra-thin electrical wire connector connection circuits include at least one extra-thin electrical wire having a conductor cross-sectional area of 0.13 sq or less as an extra-thinnest electrical wire having a smallest conductor cross-sectional area.

Effects of the Invention

According to the present disclosure, an application position of an extra-thin electrical wire can be widened.

DESCRIPTION OF EMBODIMENT(S)

Description of Embodiment of Present Disclosure

Figure 1:
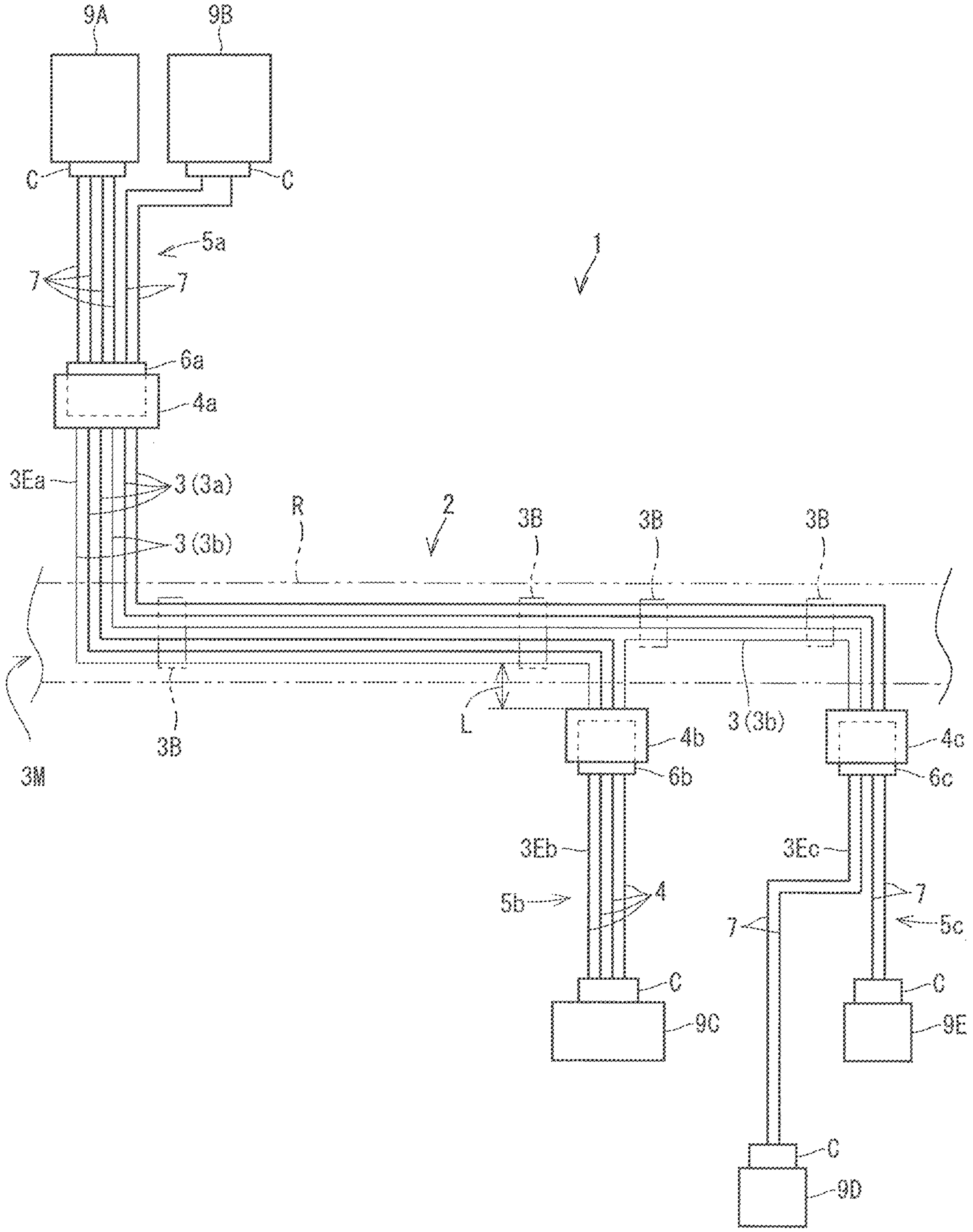
FIG. 1 is an explanation view illustrating a wiring system according to an embodiment 1.

Embodiments of the present disclosure are listed and described firstly.

A wiring system according to the present disclosure is as follows.

(1) A wiring system includes: a main wire-side wiring member including a plurality of main wire-side circuits and a plurality of main wire-side connectors, the plurality of main wire-side circuits bundled in a form with a plurality of connection ends, and the plurality of main wire-side connectors connected to the plurality of connection ends, respectively; and a terminal-side wiring member including a terminal-side connector connected to any one of the plurality of main wire-side connectors and at least one terminal-side circuit connected to the terminal-side connector, the terminal-side connector connected to any one of the plurality of main wire-side connectors so that the terminal-side circuit is electrically connected to at least some of the plurality of main wire-side circuits, wherein the plurality of main wire-side connectors include an extra-thin electrical wire connector, the plurality of main wire-side circuits include a plurality of extra-thin electrical wire connector connection circuits connected to the extra-thin electrical wire connector, and the plurality of extra-thin electrical wire connector connection circuits include at least one extra-thin electrical wire having a conductor cross-sectional area of 0.13 sq or less as an extra-thinnest electrical wire having a smallest conductor cross-sectional area.

The wiring system includes a main wire-side wiring member and a terminal-side wiring member, and the connection end of the main wire-side wiring member can be connected to an electrical component via the terminal-side wiring member. Thus, a length of the connection end can be reduced. When the length of the connection end can be reduced, tensile force hardly acts on the connection end in a handling operation of the wiring member. The plurality of extra-thin electrical wire connector connection circuits are connected to the extra-thin electrical wire connector, thus the plurality of extra-thin electrical wire connector connection circuits include an extra-thin electrical wire having a conductor cross-sectional area of 0.13 sq or less as an extra-thinnest electrical wire having a smallest conductor cross-sectional area. Thus, even when the tensile force acts on the plurality of extra-thin electrical wire connector connection circuit connected to the extra-thin electrical wire connector, the plurality of extra-thin electrical wire connector connection circuits receive the tensile force. Accordingly, the tensile force itself hardly acts on the extra-thinnest electrical wire connected to the extra-thin electrical wire connector, and even when the tensile force acts thereon, the tensile force is diffused to the plurality of extra-thin electrical wire connector connection circuits. Accordingly, the application position of the extra-thin electrical wire can be widened to the circuit connected to the extra-thin electrical wire connector in the main wire-side wiring member.

(2) In the wiring system according to (1), it is applicable that the plurality of main wire-side circuits include a multipurpose circuit and a main wire-side circuit by use, and exclusively includes as the terminal-side wiring member; a first purpose wiring member including a first purpose connector as the terminal-side connector and a first purpose circuit as the terminal-side circuit; and a second purpose wiring member including a second purpose connector as the terminal-side connector and a second purpose circuit as the terminal-side circuit, when the first purpose connector is connected to the extra-thin electrical wire connector, the multipurpose circuit is connected to the first purpose circuit, and when the second purpose connector is connected to the extra-thin electrical wire connector, the multipurpose circuit is connected to the second purpose circuit, and when the main wire-side circuit by use is connected to the first purpose circuit when the first purpose connector is connected to the extra-thin electrical wire connector, or is connected to the second purpose circuit when the second purpose connector is connected to the extra-thin electrical wire connector.

In this case, the multipurpose circuit is connected to the first purpose circuit and the second purpose circuit. Thus, a total number of electrical wires can be reduced compared with a case where a circuit connected to the first purpose circuit and a circuit connected to the second purpose circuit are separately prepared for the main wire-side wiring member. Accordingly, it is possible to easily deal with the plurality of specifications of vehicles while the number of circuits is reduced. The plurality of main wire-side circuits include the multipurpose circuit and the main wire-side circuit by use, thus the number of circuits connected to the extra-thin electrical wire connector is assumed to be larger than the number of circuits of the first purpose circuits connected to the first purpose connector or the number of circuits of the second purpose circuit connected to the second purpose connector. Thus, the tensile force on the extra-thin electrical wire can be received by a large number of circuits in a case where the extra-thin electrical wire is connected to the extra-thin electrical wire connector.

(3) In the wiring system according to (1) or (2), at least one of the plurality of main wire-side circuits connected to the extra-thin electrical wire connector may be in an opened state while the terminal-side connector is connected to the extra-thin electrical wire connector.

In this case, the opened circuit is not used for connection to the other electrical component. The tensile force on the extra-thinnest electrical wire can be diffused using the opened circuit.

(4) In the wiring system according to any one of (1) to (3), the extra-thinnest electrical wire may be an extra-thin electrical wire having a conductor cross-sectional area of 0.08 sq or less. When the extra-thinnest electrical wire is a thinner electrical wire, weight and cost of the wiring system can be reduced.

(5) In the wiring system according to any one of (1) to (4), it is applicable that the terminal-side wiring member includes the plurality of terminal-side circuits, and the plurality of terminal-side circuits are branched to a plurality of circuits from the terminal-side connector to be connected to a plurality of electrical components while the terminal-side connector is connected to the extra-thin electrical wire connector.

In this case, the number of terminal-side circuits in a branch source is larger than that of the terminal-side circuits in each branch destination. The terminal-side circuit in the branch source is connected to the terminal-side connector, and the terminal-side connector is connected to the extra-thin electrical wire connector. Thus, the number of circuits connected to the extra-thin electrical wire connector can be larger than that of the terminal-side circuits in the branch destination. The extra-thinnest electrical wire is connected to such an extra-thin electrical wire connector, thus the larger number of circuits can diffuse and receive force acting on the extra-thinnest electrical wire.

(6) In the wiring system according to any one of (1) to (5), a ratio of a total number of the extra-thin electrical wires having a conductor cross-sectional area of 0.13 sq or less to a total number of the plurality of main wire-side circuits may be equal to or larger than 40%. Accordingly, the weight and cost of the main wire-side wiring member can be further reduced.

(7) In the wiring system according to any one of (1) to (6), it is applicable that the terminal-side circuit includes a relative thick electrical wire having a conductor cross-sectional area larger than a conductor cross-sectional area of the extra-thinnest electrical wire, and the extra-thinnest electrical wire is connected to the relative thick electrical wire by connection of the terminal-side connector to the extra-thin electrical wire connector.

The terminal-side circuit as the connection destination of the extra-thin electrical wire connector extends to be longer than the main wire, thus it is considered that the tensile force easily acts thereon, and the number thereof gets small. Applied is the configuration that the terminal-side circuit includes the relative thick electrical wire thicker than the extra-thinnest electrical wire, thus even when the tensile force acts on the relative thick electrical wire, the tensile force can be received by strength of the relative thick electrical wire itself.

DETAILED DESCRIPTION OF EMBODIMENT OF PRESENT DISCLOSURE

Specific examples of a wiring system of the present disclosure are described hereinafter with reference to the drawings. The present disclosure is not limited to these examples, but is indicated by claims, and it is intended that meanings equivalent to claims and all modifications within a scope of claims are included.

Embodiment 1

A wiring system according to an embodiment 1 is described hereinafter. FIG. 1 is an explanation view illustrating the wiring system.

<Whole Configuration>

A whole configuration of a wiring system 1 is described. The wiring system 1 includes a main wire-side wiring member 2 and terminal-side wiring members 5*a*, 5*b*, and 5*c*. The wiring system 1 is a system for electrically connecting electrical components 9A, 9B, 9C, 9D, and 9E. The main wire-side wiring member 2 is a wiring member including a main wire 3M made up of collected circuits connected to the electrical components 9A, 9B, 9C, 9D, and 9E. The terminal-side wiring members 5*a*, 5*b*, and 5*c* are wiring members including an apparatus-side circuit directed to each of the electrical components 9A, 9B, 9C, 9D, and 9E from the main wire 3M. The main wire 3M may be a part in which the largest number of circuits are collected to follow one route. A part of the main wire-side wiring member 2 following the main wire 3M may be fixed to a vehicle. A fixation target position may be a reinforcement R in the vehicle, for example. The number of apparatus-side circuits may be the same as or smaller than the number of circuits in a position where the largest number of circuits are collected in the main wire 3M.

The main wire-side wiring member 2 includes a plurality of main wire-side circuits 3 and a plurality of main wire-side connectors 4*a*, 4*b*, and 4*c*.

The main wire-side circuit 3 is a medium having an elongated conductor for transmitting electricity. In the present embodiment, the main wire-side circuit 3 is a covering wire including a core wire and a covering. The core wire may be a single core wire or a stranded wire made up of a plurality of stranded strands. The covering is formed by extrusion-covering resin around the core wire, for example.

The plurality of main wire-side circuits 3 are collected to have a form with a plurality of connection ends 3Ea, 3Eb, and 3Ec. In the present embodiment, the plurality of main wire-side circuits 3 are collected along one main wire 3M. A way to collecting the plurality of main wire-side circuits 3 in the main wire 3M is optionally set. The plurality of main wire-side circuits 3 may be kept in a bundled state by a banding member 3B such as an adhesive tape or a banding band, for example. The plurality of main wire-side circuits may be fixed to a band-like sheet by welding such as ultrasonic welding and collected.

The connection end 3Ea is located on one end side of the main wire 3M, the connection end 3Ec is located on the other end side of the main wire 3M, and the connection end 3Eb is located in an intermediate part of the main wire 3M in a longitudinal direction. In the present embodiment, the main wire 3M is a straight part, and the connection ends 3Ea, 3Eb, and 3Ec intersect with the main wire 3M to extend in a direction away from the main wire 3M. The main wire-side circuit 3 may be or may not be bundled in a part extending to be away from the main wire 3M.

End portions of the main wire-side circuit 3 are aligned in each of the connection ends 3Ea, 3Eb, and 3Ec. A connector terminal is attached to the end portions of the main wire-side circuit 3 by crimping, for example, in each of the connection ends 3Ea, 3Eb, and 3Ec. The plurality of main wire-side connectors 4*a*, 4*b*, and 4*c* are connected to the plurality of connection ends 3Ea, 3Eb, and 3Ec, respectively.

The main wire-side connectors 4*a*, 4*b*, and 4*c* are connectors connected to the terminal-side connectors 6*a*, 6*b*, and 6*c*. The main wire-side connectors 4*a*, 4*b*, and 4*c* include a resin connector housing with a plurality of cavities, for example. The connector terminal of the main wire-side circuit 3 is inserted into each of the plurality of cavities of the resin connector housing, thus the plurality of main wire-side connectors 4*a*, 4*b*, and 4*c* are connected to the plurality of connection ends 3Ea, 3Eb, and 3Ec, respectively.

A length of the connection ends 3Ea, 3Eb, and 3Ec from the main wire-side circuit 3 is optionally set. A length L of the connection ends 3Ea, 3Eb, and 3Ec from the main wire-side circuit 3 may be equal to or shorter than 20 cm, 15 cm, or 10 cm. The length L of the connection ends 3Ea, 3Eb, and 3Ec from the main wire-side circuit 3 may be a distance to a base end of the main wire-side connectors 4*a*, 4*b*, and 4*c* from a position where the connection ends 3Ea, 3Eb, and 3Ec are bended and extend from the main wire-side circuit 3 as a start point, for example.

The terminal-side wiring members 5*a*, 5*b*, and 5*c* include terminal-side connectors 6*a*, 6*b*, and 6*c* and a terminal-side circuit 7.

The terminal-side connectors 6*a*, 6*b*, and 6*c* are connected to the main wire-side connectors 4*a*, 4*b*, and 4*c*, respectively. The terminal-side connectors 6*a*, 6*b*, and 6*c* include a resin connector housing with a plurality of cavities, for example. The connector terminal attached to the end portion of the terminal-side circuit 7 is inserted into each of the plurality of cavities of the resin connector housing, thus one end portion of the terminal-side circuit 7 is connected to each of the terminal-side connectors 6*a*, 6*b*, and 6*c*.

The terminal-side circuit 7 is a medium having an elongated conductor for transmitting electricity. In the present embodiment, the terminal-side circuit 7 is a covering wire including a core wire and a covering in the same manner as the main wire-side circuit 3. As described above, one end portion of the terminal-side circuit 7 is connected to any of the terminal-side connectors 6*a*, 6*b*, and 6*c*. The other end portion of the terminal-side circuit 7 is connected to any of the electrical components 9A, 9B, 9C, 9D, and 9E. The other end portion of the terminal-side circuit 7 may be connected to the electrical components 9A, 9B, 9C, 9D, and 9E via a connector C. The other end portion of the terminal-side circuit 7 may be directly connected to the terminals of the electrical components 9A, 9B, 9C, 9D, and 9E by soldering, welding, or crimping, for example.

The terminal-side wiring members 5*a*, 5*b*, and 5*c* are described separately.

The terminal-side wiring member 5*a* includes the plurality of (five in FIG. 7) terminal-side circuits 7, and one end portions of the terminal-side circuits 7 are connected to the terminal-side connector 6*a*. The terminal-side connector 6*a* is connected to the main wire-side connector 4*a*, thus the terminal-side circuit 7 is electrically connected to at least some of the plurality of main wire-side circuits 3. In the present embodiment, the number of the plurality of end portions of the main wire-side circuits 3 in the connection end 3Ea is the same as the number of the plurality of end portions of the terminal-side circuits 7, and the end portion of the main wire-side circuit 3 in the connection end 3Ea and one end portion of the terminal-side circuit 7 of the terminal-side wiring member 5*a* are connected in a one-to-one correspondence relationship.

The plurality of terminal-side circuits 7 are branched in a midway portion toward the electrical components 9A and 9B. A first group of a branch destination in the plurality of terminal-side circuits 7 is connected to the electrical component 9A, and a second group of the branch destination is connected to the electrical component 9B. The plurality of terminal-side circuits 7 need not necessarily be branched to a plurality of circuits and connected to a plurality of electrical components. It is applicable that the plurality of terminal-side circuits 7 are not branched but are connected to a single electrical component.

The terminal-side wiring member 5*b* includes the plurality of (four in FIG. 7) terminal-side circuits 7, and one end portions of the terminal-side circuits 7 are connected to the terminal-side connector 6*b*. The terminal-side connector 6*b* is connected to the main wire-side connector 4*b*, thus the terminal-side circuit 7 is electrically connected to at least some of the plurality of main wire-side circuits 3. In the present embodiment, the number of the plurality of end portions of the main wire-side circuit 3 in the connection end 3Eb is the same as the number of the plurality of one end portions of the terminal-side circuit 7 in the manner similar to the connection end 3Ea.

The plurality of terminal-side circuits 7 are not branched in a midway portion toward the electrical component 9C but are connected to the common electrical component 9C. The plurality of terminal-side circuits 7 may be branched to a plurality of circuits in the terminal-side wiring member 5*b*.

The terminal-side wiring member 5*c* includes the plurality of (four in FIG. 7) terminal-side circuits 7, and one end portions of the terminal-side circuits 7 are connected to the terminal-side connector 6*b*. The terminal-side connector 6*c* is connected to the main wire-side connector 4*c*, thus the terminal-side circuit 7 is electrically connected to at least some of the plurality of main wire-side circuits 3. In the present embodiment, the number of the plurality of end portions of the main wire-side circuit 3 in the connection end 3Ec is the same as the number of the plurality of one end portions of the terminal-side circuit 7 in the manner similar to the connection end 3Ea.

The plurality of terminal-side circuits 7 are branched in a midway portion toward the electrical components 9D and 9E. A first group of a branch destination in the plurality of terminal-side circuits 7 is connected to the electrical component 9D, and a second group of the branch destination is connected to the electrical component 9E. The plurality of terminal-side circuits 7 need not necessarily be branched to a plurality of circuits and connected to a plurality of electrical components. It is applicable that the plurality of terminal-side circuits 7 are not branched but are connected to a single electrical component.

In each of the terminal-side wiring members 5*a*, 5*b*, and 5*c*, the number of the terminal-side circuits 7 connected to the terminal-side connectors 6*a*, 6*b*, and 6*c* needs not be the same as the number of the main wire-side circuits 3 connected to the main wire-side connectors 4*a*, 4*b*, and 4*c* as the connection destinations. The number of the former may be larger or smaller than that of the latter.

Various electrical components mounted to a vehicle are assumed as the electrical component. Assumed as the electrical component, for example, is a display device displaying various types of information for a driver, a switch receiving various instructions from the driver, an electronic control unit (ECU), a drive component driving each part (such as a motor), or a sensor detecting various states.

<Application of Extra-Thin Electrical Wire>

An application example of an extra-thin electrical wire in the above wiring system 1 is described.

The plurality of main wire-side connectors 4*a*, 4*b*, and 4*c* include an extra-thin electrical wire connector. In the present embodiment, the plurality of main wire-side connectors 4*a*, 4*b*, and 4*c* are extra-thin electrical wire connectors. The extra-thin electrical wire connector indicates a connector to which at least one extra-thin electrical wire is connected, and does not indicate only a connector to which only an extra-thin electrical wire is connected. Thus, an electrical wire thicker than an extra-thin electrical wire may be connected to the extra-thin electrical wire connector. Needless to say, only an extra-thin electrical wire may be connected to the extra-thin electrical wire connector. The extra-thin electrical wire is an electrical wire having an extra-small conductor cross-sectional area, and is an electrical wire having a conductor cross-sectional area of 0.13 sq or less, for example. For example, the extra-thin electrical wire may be an electrical wire for transmitting a signal.

The plurality of main wire-side circuits 3 include a plurality of extra-thin electrical wire connector connection circuits connected to the main wire-side connectors 4*a*, 4*b*, and 4*c* as the extra-thin electrical wire connector. In the present embodiment, all of the plurality of main wire-side circuits 3 are extra-thin electrical wire connector connection circuits.

For example, as described above, when the plurality of main wire-side connectors 4*a*, 4*b*, and 4*c* include a connector which is not the extra-thin electrical wire connector, also assumed is a case where some of the plurality of main wire-side circuits 3 are not the extra-thin electrical wire connector connection circuits. The number of the main wire-side circuits 3 connected to the main wire-side connectors 4*a*, 4*b*, and 4*c*, respectively, is optionally set, and twenty to thirty main wire-side circuits 3 may be connected, for example.

The main wire-side circuits 3 as the plurality of extra-thin electrical wire connector connection circuits include an extra-thin electrical wire having a conductor cross-sectional area of 0.13 sq or less as an extra-thinnest electrical wire having a smallest conductor cross-sectional area. The main wire-side circuits 3 may be distinguished as an extra-thinnest electrical wire 3*a* and an electrical wire 3*b* having a larger conductor cross-sectional area than the extra-thinnest electrical wire 3*a* in some cases hereinafter for convenience of description. In FIG. 1, the extra-thinnest electrical wire 3*a* is conveniently illustrated by a thinner line than the electrical wire 3*b*.

Herein, sq is an abbreviation of “square”, and indicates square mm. Thus, the extra-thin electrical wire having the conductor cross-sectional area of 0.13 sq indicates an extra-thin electrical wire having a conductor cross-sectional area of 0.13 square mm, thus the extra-thin electrical wire having the conductor cross-sectional area of 0.13 sq or less indicates an extra-thin electrical wire having a conductor cross-sectional area of 0.13 square mm or less. The extra-thin electrical wire having the conductor cross-sectional area of 0.13 sq may be considered an electrical wire complying with 0.13 sq in JIS standard. Thus, the extra-thin electrical wire having the conductor cross-sectional area of 0.13 sq or less may be an electrical wire complying with 0.13 sq in JIS standard or an electrical wire having a smaller conductor cross-sectional area than the electrical wire. For example, the extra-thin electrical wire having the conductor cross-sectional area of 0.13 sq or less may be an electrical wire having a conductor cross-sectional area of 0.1 sq, 0.08 sq, or 0.05 sq in JIS standard. For example, the extra-thin electrical wire having the conductor cross-sectional area of 0.13 sq or less may be an electrical wire complying with AWG 22 in American wire gauge and an electrical wire of a standard having a conductor cross-sectional area smaller than the electrical wire complying with AWG 22 (for example, an electrical wire of AWG 26). Description in the present embodiment is based on an assumption that the extra-thinnest electrical wire 3*a* is an extra-thin electrical wire having a conductor cross-sectional area of 0.13 sq or less unless otherwise described. The conductor cross-sectional area of the extra-thin electrical wire is preferably equal to or larger than 0.002 sq from a viewpoint of resistance to disconnection caused by vibration, for example.

In the example illustrated in FIG. 1, some of the main wire-side circuits 3 are the extra-thinnest electrical wire 3*a*, and remaining main wire-side circuits 3 are the electrical wire 3*b* having the larger conductor cross-sectional area than the extra-thinnest electrical wire 3*a*. The electrical wire 3*b* may be an electrical wire having a conductor cross-sectional area larger than 0.13 sq such as an electrical wire having a conductor cross-sectional area of 0.35 sq, 0.5 sq, 0.75 sq, or 1.25 sq, or an electrical wire having a larger conductor cross-sectional area than such an electrical wire, for example. The electrical wire 3*b* needs not include only electrical wires having a single type of conductor cross-sectional area, but may include electrical wires having various types of conductor cross-sectional area. When the extra-thinnest electrical wire 3*a* is a thinner electrical wire such as an extra-thin electrical wire having a conductor cross-sectional area of 0.1 sq, the electrical wire 3*b* may include an electrical wire having a conductor cross-sectional area of 0.13 sq in some cases. At least some of the electrical wires 3*b* may be an electrical wire for supplying electrical power or ground. The main wire-side wiring member may also be considered to include plural types of electrical wire having a different conductor cross-sectional area, and a minimum value of the conductor cross-sectional area of the plural types of electrical wire is equal to or smaller than 0.13 sq.

In the present embodiment, the main wire-side circuit 3 connecting the main wire-side connector 4*a* and the main wire-side connector 4*b* includes one extra-thinnest electrical wire 3*a* and two electrical wires 3*b*. The main wire-side circuit 3 connecting the main wire-side connector 4*a* and the main wire-side connector 4*c* includes two extra-thinnest electrical wires 3*a* and two electrical wires 3*b*. The main wire-side circuit 3 connecting the main wire-side connector 4*b* and the main wire-side connector 4*b* includes one extra-thinnest electrical wire 3*a*.

The number and an application position of the extra-thinnest electrical wires 3*a* and the electrical wires 3*b* in the main wire-side circuit 3 described above are optionally set. For example, one of the main wire-side circuits 3 may be the extra-thinnest electrical wire 3*a*, or all of the main wire-side circuits 3 may be the extra-thinnest electrical wires 3*a*.

Herein, as described above, the extra-thinnest electrical wire is the electrical wire having the conductor cross-sectional area of 0.13 sq or less. When the extra-thinnest electrical wire 3*a* is the electrical wire having the conductor cross-sectional area of 0.13 sq, the number of the extra-thin electrical wires in the main wire-side circuit 3 is the same as the number of the extra-thinnest electrical wires 3*a*. When the extra-thinnest electrical wire 3*a* is the electrical wire having the conductor cross-sectional area smaller than 0.13 sq, the number of the extra-thin electrical wires in the main wire-side circuit 3 is equal to the number of the extra-thinnest electrical wires 3*a* plus the number of the extra-thin electrical wires each having a conductor cross-sectional area of 0.13 or less in the electrical wire 3*b*.

In this case, a ratio of the number of the extra-thin electrical wires having the conductor cross-sectional area of 0.13 sq or less to the total number of the plurality of the main wire-side circuits 3 may be equal to or larger than 40% or equal to or larger than 50%. The ratio may be equal to or smaller than 70% or equal to or smaller than 60%. In the example illustrated in FIG. 1 in the present embodiment, a ratio of three extra-thin electrical wires each having the conductor cross-sectional area of 0.13 sq or less to seven main wire-side circuits 3 in total is approximately 42.9%.

A ratio of a conductor cross-sectional area of the terminal-side circuit 7 to a conductor cross-sectional area of the terminal-side wiring members 5*a*, 5*b*, and 5*c* is optionally set. The conductor cross-sectional area of the terminal-side circuit 7 may be larger than that of the extra-thinnest electrical wire 3*a* described above, for example. For example, the terminal-side circuit 7 may be an electrical wire having a conductor cross-sectional area larger than 0.13 sq. The terminal-side circuit 7 may be an electrical wire having a conductor cross-sectional area of 0.35 sq, 0.5 sq, 0.75 sq, or 1.25 sq, or an electrical wire having a larger conductor cross-sectional area than such an electrical wire, for example. The terminal-side circuit 7 needs not include only electrical wires having a single type of conductor cross-sectional area, but may include electrical wires having various types of conductor cross-sectional area. The terminal-side circuit 7 may include an electrical wire having a conductor cross-sectional area of 0.13 sq or less.

Figure 2:
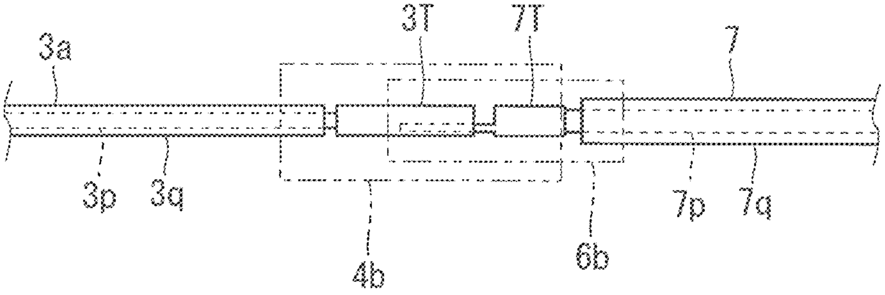
FIG. 2 is an explanation view illustrating an example of a connection between an extra-thinnest electrical wire and a terminal-side circuit.

FIG. 2 is an explanation view illustrating an example of a connection between the extra-thinnest electrical wire 3*a* and the terminal-side circuit 7. As illustrated in FIG. 2, a connector terminal 3T is connected to an end portion of the extra-thinnest electrical wire 3*a*, and is inserted into a cavity of the main wire-side connector 4*b*. The extra-thinnest electrical wire 3*a* includes a core wire 3*p* and a covering 3*q* covering the core wire 3*p*. A connector terminal 7T is connected to an end portion of the terminal-side circuit 7 as a connection destination of the extra-thinnest electrical wire 3*a*, and is inserted into the terminal-side connector 6*b*. The terminal-side circuit 7 includes a core wire 7*p* and a covering 7*q* covering the core wire 7*p*.

The main wire-side connector 4*b* and the terminal-side connector 6*b* are connected, thus the core wire 3*p* of the extra-thinnest electrical wire 3*a* is electrically connected to the core wire 7*p* of the terminal-side circuit 7. A conductor cross-sectional area of the core wire 3*p* is smaller than that of the core wire 7*p*. The terminal-side circuit 7 described above is an example of a relative thick electrical wire having a conductor cross-sectional area larger than the extra-thinnest electrical wire 3*a*.

<Effect>

According to the wiring system 1 having such a configuration, the wiring system 1 includes the main wire-side wiring member 2 and the terminal-side wiring members 5*a*, 5*b*, and 5*c*, and the connection ends 3Ea, 3Eb, and 3Ec of the main wire-side wiring member 2 are connected to the electrical components 9A, 9B, 9C, 9D, and 9E via the terminal-side wiring members 5*a*, 5*b*, an 5*c*. Thus, the length L of the connection ends 3Ea, 3Eb, and 3Ec can be reduced compared with a case where the electrical wire, for example, directly extends from a route of the main wire 3M to be connected to the electrical components 9A, 9B, 9C, 9D, and 9E. When the length L of the connection ends 3Ea, 3Eb, and 3Ec can be reduced, the connection ends 3Ea, 3Eb, and 3Ec are hardly caught on the other part in housing and transporting the main wire-side wiring member 2, and assembling the main wire-side wiring member 2 to a vehicle, for example, thus tensile force or impact is hardly applied to the connection ends 3Ea, 3Eb, and 3Ec.

The main wire-side circuits 3 as the plurality of extra-thin electrical wire connector connection circuits are connected to the main wire-side connectors 4*a*, 4*b*, and 4*c* as the extra-thin electrical wire connectors, respectively, and the plurality of main wire-side circuits 3 include the extra-thin electrical wire having the conductor cross-sectional area of 0.13 sq or less as the extra-thinnest electrical wire 3*a* having the smallest conductor cross-sectional area. Thus, even when the tensile force or impact force acts on the plurality of main wire-side circuits 3 connected to the main wire-side connectors 4*a*, 4*b*, and 4*c*, the plurality of main wire-side circuits 3 receive the force.

As described above, the tensile force or the impact force itself hardly acts on the extra-thinnest electrical wire connected to the main wire-side connectors 4*a*, 4*b*, and 4*c* on the end portions of the shortened connection ends 3Ea, 3Eb, and 3Ec, and even when the tensile force or the impact force acts thereon, the force is diffused and received by the plurality of main wire-side circuits 3. Accordingly, the application position of the extra-thin electrical wire, particularly the extra-thinnest electrical wire 3*a*, can be widened to the circuit connected to the main wire-side connectors 4*a*, 4*b*, and 4*c* as the extra-thin electrical wire connector in the main wire-side wiring member 2.

The extra-thinnest electrical wire 3*a* is light in weight and inexpensive compared with an electrical wire having a larger conductor cross-sectional area than the extra-thinnest electrical wire 3*a*, thus when the application position of the extra-thinnest electrical wire 3*a* is widened, weight and cost of the main wire-side wiring member 2 can be reduced.

Particularly, the extra-thin electrical wire having the conductor cross-sectional area of 0.08 sq or less as the extra-thinnest electrical wire 3*a*, thus weight and cost of the wiring system can be further reduced.

When a ratio of the number of the extra-thin electrical wires each having the conductor cross-sectional area of 0.13 sq or less (the number of the extra-thinnest electrical wires 3*a* or a sum of the number of the extra-thinnest electrical wires 3*a* and the number of the extra-thin electrical wires in the electrical wires 3*a*) to the total number of the plurality of main wire-side circuits 3 is equal to or larger than 40%, weight and cost of the main wire-side wiring member 2 can be further reduced.

The terminal-side circuit 7 includes the electrical wire 3*b* as the relative thick electrical wire having the larger conductor cross-sectional area than the extra-thinnest electrical wire, and the extra-thinnest electrical wire 3*a* is connected to the electrical wire 3*b* as the relative thick electrical wire by the connection of the terminal-side connectors 6*a*, 6*b*, and 6*c* to the main wire-side connectors 4*a*, 4*b*, and 4*c* as the extra-thinnest electrical wire connectors. Herein, there is a possibility that the terminal-side wiring members 5*a*, 5*b*, and 5*c* are longer than the connection ends 3Ea, 3Eb, and 3Ec described above, thus may be caught on the other part in housing and transporting the terminal-side wiring members 5*a*, 5*b*, and 5*c*, and assembling the terminal-side wiring members 5*a*, 5*b*, and 5*c* to a vehicle, for example, and tensile force or impact may act between a position of connection to the terminal-side connectors 6*a*, 6*b*, and 6*c* or the electrical components 9A, 9B, 9C, 9D and the terminal-side circuit 7. The number of the terminal-side circuits 7 themselves is considered to be smaller than that of the electrical wires 3*a* and 3*b* of the connection sources depending on presence or absence of installation of the electrical components 9A, 9B, 9C, 9D, and 9E as the connection destinations. When the number of the terminal-side circuits 7 themselves is smaller than that of the electrical wires 3*a* and 3*b* of the connection sources, some of the electrical wires of the connection sources are not connected to the terminal-side circuit 7 but are in an opened state. Furthermore, when the terminal-side circuit 7 is branched to the plurality of circuits as the terminal-side wiring members 5*a* and 5*c*, there is a possibility that the number of the terminal-side circuits 7 which is the same as the number of the main wire-side circuits 3 in the branch source gets small in the branch destination.

Applied is the configuration that the terminal-side circuit 7 includes the relative thick electrical wire thicker than the extra-thinnest electrical wire 3*a*, thus even when the tensile force acts on the terminal-side circuit 7, the tensile force can be received by strength of the relative thick electrical wire itself. Accordingly, a ratio of usage of the extra-thin electrical wire such as the extra-thinnest electrical wire 3*a* is increased and weight and cost are reduced as the whole wiring system 1, and a position required for the tensile strength, for example, can be set to withstand the tensile force.

The terminal-side wiring members 5*a*, 5*b*, and 5*c* may include the extra-thin electrical wire, and a ratio of the number of the extra-thin electrical wires to the total number of the circuits in the terminal-side wiring members 5*a*, 5*b*, and 5*c* is preferably smaller than the ratio of the number of the extra-thin electrical wires to the total number of the circuits in the main wire-side wiring member 2.

When the connection ends 3Ea and 3Ec are seen while focusing on the branched terminal-side wiring members 5*a* and 5*c*, the number of the electrical wires 3*a* and 3*b* connected to the connection ends 3Ea and 3Ec is larger than the number of the terminal-side circuits 7 of each branch destination in the terminal-side wiring members 5*a* and 5*c*. Thus, in the case where the extra-thinnest electrical wire 3*a* is connected to the terminal-side connectors 6*a* and 6*c* as such an extra-thin electrical wire connector, force acting on the extra-thinnest electrical wire 3*a* can be diffused and received by the larger number of electrical wires 3*a* and 3*b*.

Embodiment 2

A wiring system 30 according to an embodiment 2 is described. As described in the embodiment 1, the configuration according to the main wire-side wiring member with the extra-thinnest electrical wire may be applied to the wiring system according to the embodiment 2. In the wiring system according to the embodiment 2, a multipurpose wiring member as an example of the main wire-side wiring member includes a plurality of circuits for electrical connection according to different specifications, and some of the plurality of circuits are used for electrical connection of the different specifications. Thus, there is a possibility that the number of circuits of the multipurpose wiring member is larger than that of circuits of the wiring member according to each specification, but is smaller than that of a wiring part in which wiring members according to each specification are simply integrated. Thus, the multipurpose wiring member is a wiring member capable of corresponding to different specifications with the smallest possible number of circuits. The plurality of circuits include the extra-thin electrical wire having the conductor cross-sectional area of 0.13 sq or less as the extra-thinnest electrical wire having the smallest conductor cross-sectional area in the multipurpose wiring member, thus weight of the multipurpose wiring member can be reduced while achieving the configuration capable of withstanding the tensile force and the impact, for example, on the extra-thinnest electrical wire. A wiring system including the multipurpose wiring member is described hereinafter.

<Example of System Equipped in Vehicle>

Figure 3:
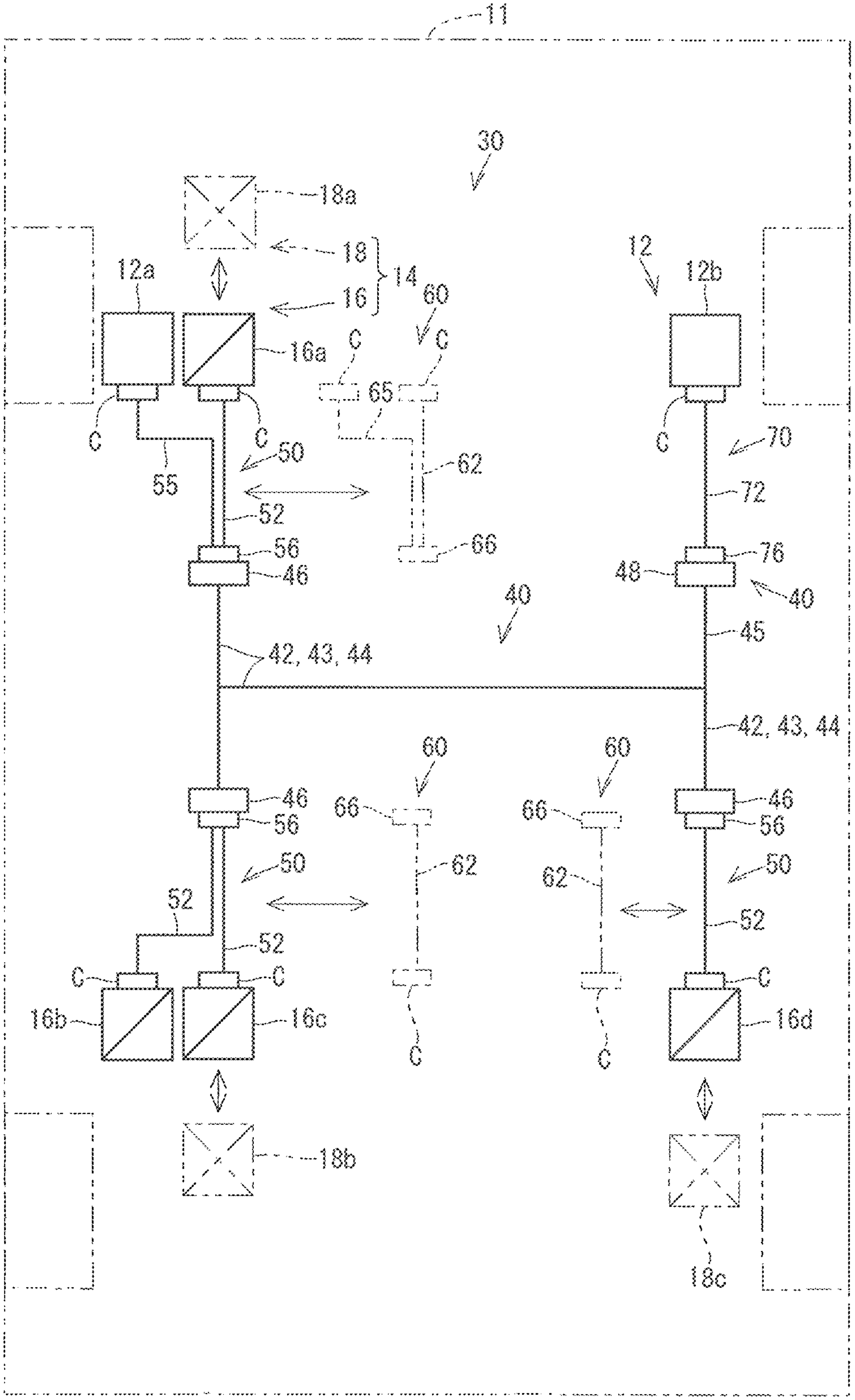
FIG. 3 is a diagram illustrating a wiring system in a vehicle.

An example of a system mounted to a vehicle is described for convenience of description. FIG. 3 is a diagram illustrating a wiring system 30 in a vehicle 11. A common equipment system 12 is mounted to the vehicle 11. The common equipment system 12 is a system mounted to specific platform or a specific type of vehicle in common regardless of a difference of a grade and a difference of an optional component. For example, when a common installment panel system is mounted to a specific platform or a specific type of vehicle, the installment panel system is an example of the common equipment system 12. The common equipment system 12 includes at least one of electrical components 12*a* and 12*b* for achieving a function of the common equipment system 12. For example, when the common equipment system 12 is an installment panel system, the common equipment system 12 includes a display device displaying various types of information for a driver, a switch receiving various instructions from the driver, and an ECU as the electrical components 12*a* and 12*b*. The ECU performs display control of the display device, reception of instruction via the switch, and reception of various signals from various types 5 of sensors and the other ECU, for example. FIG. 3 exemplifies two electrical components 12*a* and 12*b*, however, the number and position thereof are not particularly limited.

An exclusive equipment system 14 is set to the vehicle 11. The exclusive equipment system 14 is a system capable of exclusively adopting a first equipment specification 16 and a second equipment specification 18 to the vehicle 11. Herein, an exclusive state indicates that when any one of a plurality of conditions is established, the other condition is not established. Thus, a state where the first equipment specification 16 and the second equipment specification 18 can be exclusively adopted indicates that when the first equipment specification 16 is adopted, the second equipment specification 18 cannot be adopted, and when the second equipment specification 18 is adopted, the first equipment specification 16 cannot be adopted. In this case, the exclusive equipment system 14 does not exclude a state where a third equipment specification and a fourth equipment specification, for example, can be adopted as the other exclusive choices in addition to the first equipment specification 16 and the second equipment specification 18.

An example of the exclusive equipment system is a case where the first equipment specification 16 is an automatic transmission (AT) specification, and the second equipment specification 18 is a manual transmission (MT) specification. For example, when the first equipment specification 16 is the AT specification, the exclusive equipment system includes a sensor detecting a position of a shift lever, a switch receiving instruction on an operation mode of AT, an AT mechanism including various solenoids and various sensors to change the number of rotations of a drive source, and an ECU for AT, as the electrical components 16*a*, 16*b*, 16*c*, and 16*d*. The ECU for AT controls a transmission gear ratio in the AT mechanism in accordance with a vehicle speed, the number of rotations of an engine, and an operation of an accelerator, for example. For example, when the second equipment specification 18 is the MT specification, the exclusive equipment system includes a sensor detecting a position of a shift lever, a sensor detecting a position of a clutch pedal, and an ECU for an engine, as the electrical components 18*a*, 18*b*, and 18*c*. The description according to the present embodiment is based on an assumption that the first equipment specification 16 is the AT specification, and the second equipment specification 18 is the MT specification. The AT specification and the MT specification are exclusively mounted to the vehicle 11 as specifications changing the rotation of the travel drive source and transmitting it to vehicle wheels.

FIG. 3 exemplifies two electrical components 12*a* and 12*b*, four electrical components 16*a*, 16*b*, 16*c*, and 16*d*, and three electrical components 18*a*, 18*b*, and 18*c*, however, the number and position thereof are optionally set.

The other example of the exclusive equipment system is a case where the first equipment specification is a mechanical key specification and the second equipment specification is a smart key specification. The mechanical key specification is a system that a key owned by a driver is inserted into a keyhole provided to a door or an area around a handle in a vehicle to lock and unlock the door, switch a state to a handle unlocked-state, and switch a state to an operable state of a power source, for example. The smart key specification is a system performing wireless communication between a wireless communication device mounted to a vehicle and a wireless key terminal owned by a driver to lock and unlock a door of the vehicle, switch a state to a handle unlocked-state, and switch a state to an operable state of a power source, for example. There is a possibility that the smart key specification includes a configuration relating to the mechanical key specification. A configuration relating to the smart key specification is not incorporated into the mechanical key specification. The mechanical key specification and the smart key specification are exclusively mounted to the vehicle as a security specification locking and unlocking each unit in the vehicle.

The still other example of the exclusive equipment system is a case where the first equipment specification is a specification for an internal combustion engine and the second equipment specification is a specification for a hybrid of an internal combustion engine and an electrical motor regarding a travel power system of a vehicle. In this case, the first equipment specification or the second equipment specification may be a specification for an electrical motor. A specification for an electrical motor may be set as a third equipment specification in addition to the first equipment specification and the second equipment specification. Each specification described above is exclusively mounted to a vehicle as a system regarding a travel power of the vehicle.

The still other example of the exclusive equipment system is a case where the first equipment specification is a simple specification and the second equipment specification is a deluxe specification regarding a system of a sound and a video in a vehicle. For example, assumed is a case where the first equipment specification is a specification including only a radio receiver and a speaker and the second equipment specification is a specification including a multimedia player, a display device, a multichannel speaker, and a camera taking an image outside the vehicle.

In the example of the common equipment system and the exclusive equipment system described above, some of the electrical components constituting the common equipment system and some of the electrical components constituting the exclusive equipment system may be used in common in both the systems. Some of the electrical components constituting the first equipment specification and some of the electrical components constituting the second equipment specification set as the exclusive equipment system may be used in common.

The first equipment specification and the second equipment specification may be specifications exclusively selected in manufacturing the vehicle or specifications exclusively selected after manufacturing the vehicle. After one of the first equipment specification and the second equipment specification is selected in manufacturing the vehicle, the specification may be changed to the other one of the first equipment specification and the second equipment specification. For example, the system regarding the sound and the video in the vehicle can be the specification exclusively selected after manufacturing the vehicle, and can be the specification changed from one of the first equipment specification and the second equipment specification to the other one thereof after manufacturing the vehicle.

<Wiring System>

The wiring system 30 is described with reference to FIG. 3. Circuits 42, 45, 52, 55, 62, 65, and 72 illustrated by one line in FIG. 3 may include a plurality of circuits in some cases.

The wiring system 30 includes a multipurpose wiring member 40, and further exclusively includes a first purpose wiring member 50 and a second purpose wiring member 60. Herein, the exclusive state indicates that when the first purpose wiring member 50 is included, the second purpose wiring member 60 is not included, and when the second purpose wiring member 60 is included, the first purpose wiring member 50 is not included as described above, thus the system 30 as a whole does not deny a possibility of existence of third purpose wiring member or a fourth purpose wiring member, for example.

The multipurpose wiring member 40 includes a multipurpose circuit 42, the main wire-side first purpose circuit 43, the main wire-side second purpose circuit 44, and a multipurpose connector 46. One line shown as the circuits 42, 43, and 44 in FIG. 3 may include a plurality of circuits depending on a position in some cases.

The multipurpose circuit 42, the main wire-side first purpose circuit 43, and the main wire-side second purpose circuit 44 are examples of the main wire-side circuit.

The multipurpose circuit 42 is a part made up of a wire-like conductive member to transmit electricity. The multipurpose circuit 42 may be used for transmitting an electrical signal or electrical power. The multipurpose circuit 42 may be a core wire in an electrical wire including the core wire and a covering around the core wire. The electrical wire may be a non-stranded electrical wire or a stranded electrical wire, or may also have a form of a cable around which a shield layer is formed. The multipurpose circuit 42 may not be a core wire in an electrical wire. For example, the multipurpose circuit 42 may be a conductor formed along a predetermined route on a flat insulating base material. For example, the multipurpose circuit may include a circuit pattern in a flexible printed circuit (FPC) in which a circuit pattern of metal foil is formed between a pair of resin films. Description in the present embodiment is based on an assumption that the multipurpose circuit 42 is a core wire in an electrical wire. The description of the multipurpose circuit 42 in the present paragraph can also be adopted to the circuits 42, 43, 44, 45, 52, 55, 62, 65, and 72 described hereinafter, for example, in the similar manner.

The multipurpose circuit 42 is a circuit used for any of the first purpose wiring member 50 and the second purpose wiring member 60. In other words, the multipurpose circuit 42 is a circuit used as a transmission path of electricity in any of the first equipment specification 16 and the second equipment specification 18. That is to say, the multipurpose unit indicates that the unit has a plurality of usage purposes. The multipurpose circuit 42 is also considered a circuit connected to different types of electrical components 16*a*, 16*b*, 16*c*, and 16*d* or electrical components 18*a*, 18*b*, and 18*c* in accordance with the selected specification.

The main wire-side first purpose circuit 43 is a circuit used for the first purpose wiring member 50, and is an example of a main wire-side circuit by use. In other words, the main wire-side first purpose circuit 43 is a circuit used as a transmission path of electricity in the first equipment specification 16. The main wire-side first purpose circuit 43 is used or is not used as a transmission path of electricity in accordance with a selected specification.

The main wire-side second purpose circuit 44 is a circuit used for the second purpose wiring member 60, and is an example of the main wire-side circuit by use. In other words, the main wire-side second purpose circuit 44 is a circuit used as a transmission path of electricity in the second equipment specification 18. The main wire-side second purpose circuit 44 is used or is not used as a transmission path of electricity in accordance with a selected specification.

The plurality of main wire-side circuits including the multipurpose circuit 42, the main wire-side first purpose circuit 43, and the main wire-side second purpose circuit 44 are collected in a form including a plurality of connection ends in the manner similar to the first embodiment.

The multipurpose connector 46 is a connector to which at least one of the multipurpose circuit 42, the main wire-side first purpose circuit 43, and/or the main wire-side second purpose circuit 44 is connected. That is to say, the multipurpose connector 46 is an example of the main wire-side connector connected to each connection end of the main wire-side circuit including the multipurpose circuit 42, the main wire-side first purpose circuit 43, and the main wire-side second purpose circuit 44. A first purpose connector 56 or a second purpose connector 66 described hereinafter are exclusively connected to the multipurpose connector 46.

The multipurpose wiring member 40 may include a common circuit 45. The common circuit 45 is a circuit used as a transmission path of the same type of electricity even when any of the first purpose wiring member 50 and the second purpose wiring member 60 is selected. The common circuit 45 is a circuit electrically connected to the electrical components 12*a* and 12*b* constituting the common equipment system 12, for example. A larger number of common circuits 45 may be applicable, and the number thereof may be larger than that of circuits regarding the exclusive equipment system 14, for example. The multipurpose wiring member 40 needs not necessarily include the common circuit 45.

The multipurpose wiring member 40 may include a common connector 48. The common connector 48 is a connector used as a connection interface to another wiring member or electrical component even when any of the first purpose wiring member 50 and the second purpose wiring member 60 is selected. For example, the common circuit 45 is assumed to be connected to the common connector 48. The multipurpose wiring member 40 needs not necessarily include the common connector 48.

The first purpose wiring member 50 includes a first purpose circuit 52 and the first purpose connector 56. FIG. 3 illustrates three first purpose wiring members 50. The first purpose wiring member 50 is an example of the terminal-side wiring member, the first purpose circuit 52 is an example of the terminal-side circuit, and the first purpose connector 56 is an example of the terminal-side connector.

The first purpose circuit 52 is connected to the first purpose connector 56. The first purpose connector 56 is connected to the multipurpose connector 46, thus the multipurpose circuit 42 is electrically connected to the first purpose circuit 52. It is applicable that the first purpose connector 56 is connected to the multipurpose connector 46, thus the main wire-side first purpose circuit 43 is connected to the first purpose circuit 52. When the first purpose connector 56 is connected to the multipurpose connector 46, the main wire-side second purpose circuit 44 is not connected to the first purpose circuit 52.

The first purpose circuit 52 is electrically connected to the electrical components 16*a*, 16*b*, 16*c*, and 16*d* in the first equipment specification 16. The first purpose circuit 52 may be connected to the electrical components 16*a*, 16*b*, 16*c*, and 16*d* via the connector C. It is applicable that the other end portion of the first purpose circuit 52 is directly led to the electrical components 16*a*, 16*b*, 16*c*, and 16*d* to be connected to electrical elements of the electrical components 16*a*, 16*b*, 16*c*, and 16*d* without intervention of the connector. The electrical components 16*a*, 16*b*, 16*c*, and 16*d* are examples of a first electrical component.

The second purpose wiring member 60 includes the second purpose circuit 62 and the second purpose connector 66. FIG. 3 illustrates three second purpose wiring members 60 corresponding to three first purpose wiring members 50 described above. The second purpose wiring member 60 is an example of the terminal-side wiring member, the second purpose circuit 62 is an example of the terminal-side circuit, and the second purpose connector 66 is an example of the terminal-side connector.

The number of the first purpose wiring members 50 needs not be necessarily the same as that of the second purpose wiring members 60. Assumed in this case is a case where there is no connection destination for the multipurpose connector 46 depending on the specification. The first purpose wiring member 50 and the second purpose wiring member 60 are exclusively assembled to the vehicle 11 in accordance with the selected specification. In other words, the second purpose wiring member 60 is connected to the second electrical component (for example, the electrical components 18*a*, 18*b*, and 18*c*) exclusively mounted with respect to the first electrical component (for example, the electrical components 16*a*, 16*b*, 16*c*, and 16*d*) in the vehicle 11.

The second purpose circuit 62 is connected to the second purpose connector 66. The second purpose connector 66 is connected to the multipurpose connector 46, thus the multipurpose circuit 42 is electrically connected to the second purpose circuit 62. It is applicable that the second purpose connector 66 is connected to the multipurpose connector 46, thus the main wire-side second purpose circuit 44 is electrically connected to the second purpose circuit 62. When the second purpose connector 66 is connected to the multipurpose connector 46, the main wire-side first purpose circuit 43 is not electrically connected to the second purpose circuit 62.

That is to say, in the two states where the first purpose connector 56 and the second purpose connector 66 are connected to the multipurpose connector 46, the main wire-side first purpose circuit 43 is the circuit which is connected to the first purpose circuit 52 but is not connected to the second purpose circuit 62, and the main wire-side second purpose circuit 44 is the circuit which is not connected to the first purpose circuit 52 but is connected to the second purpose circuit 62.

The second purpose circuit 62 is electrically connected to the electrical components 18*a*, 18*b*, and 18*c* in the second equipment specification 18. The second purpose circuit 62 may be connected to the electrical components 18*a*, 18*b*, 18*c*, and 18*d* via the connector C. It is applicable that the other end portion of the second purpose circuit 62 is directly led to the electrical components 18*a*, 18*b*, and 18*c* to be connected to electrical elements of the electrical components 18*a*, 18*b*, and 18*c* without intervention of the connector. The electrical components 18*a*, 18*b*, 18*c*, and 18*d* are examples of the second electrical component of a type different from the first electrical component. A state where the type of the first electrical component is different from that of the second electrical component indicates that they can be grasped as different types of components as a result of a fact that specifications to be applied are different from each other, for example. It is also assumed that some of the plurality of first electrical components constituting the first equipment specification and some of the plurality of second electrical components constituting the second equipment specification are the same components.

The first purpose connector 56 and the second purpose connector 66 are connected to the same multipurpose connector 46. Thus, the second purpose connector 66 is assumed to be the same connector as the first purpose connector 56. However, the number of the first purpose circuits 52 is different from that of the second purpose circuits 62, thus it is assumed that the number of the connector terminals of the first purpose connector 56 and the second purpose connector 66 are different from each other or at least one of the first purpose connector 56 and/or the second purpose connector 66 includes a dummy connector terminal which is not connected to the electrical wire.

When the plurality of electrical components are connection destinations of the multipurpose connector 46, the plurality of first purpose circuits 52 or the plurality of second purpose circuits 62 may be branched in a midway portion in the first purpose wiring member 50 or the second purpose wiring member 60. In FIG. 3, the plurality of first purpose circuits 52 are branched in a midway portion in accordance with the electrical components 16*b* and 16*c* in the first equipment specification 16.

Each of the first purpose wiring member 50 and the second purpose wiring member 60 may include terminal-side common circuits 55 and 65 for the electrical components 12*a* and 12*b* in the common equipment system 12. FIG. 3 illustrates an example that the first purpose wiring member 50 includes the terminal-side common circuit 55 and the second purpose wiring member 60 includes the terminal-side common circuit 65 to correspond to the electrical component 12*a*. The terminal-side common circuit 55 is connected to the first purpose connector 56, and the terminal-side common circuit 65 is connected to the second purpose connector 66. When the first purpose wiring member 50 is selected, the common circuit 45 in the multipurpose wiring member 40 is connected to the electrical component 12*a* via the terminal-side common circuit 55. When the second purpose wiring member 60 is selected, the common circuit 45 in the multipurpose wiring member 40 is connected to the electrical component 12*a* via the terminal-side common circuit 65. That is to say, the terminal-side common circuits 55 and 65 are circuits connected to the same type of electrical component regardless of the specification.

In FIG. 3, a terminal-side common wiring member 70 is connected to the common connector 48. The terminal-side common wiring member 70 includes a circuit 72 and a connector 76. One end portion of the circuit 72 is connected to the connector 76, and the other end portion of the circuit 72 is connected to the electrical component 12*b* in the common equipment system via the connector C or without intervention of the connector. The connector 76 is connected to the common connector 48, thus the common circuit 45 in the multipurpose wiring member 40 is connected to the electrical component 12*b* via the circuit 72. That is to say, the terminal-side common wiring member 70 is a wiring member which does not include the first purpose circuit 52 and the second purpose circuit 62 but is connected to the same type of electrical component regardless of the specification.

Considered in the present embodiment 2 is that the multipurpose connector 46 is the extra-thin electrical wire connector, the main wire-side circuit including the multipurpose circuit 42, the main wire-side first purpose circuit 43, and the main wire-side second purpose circuit 44 includes the plurality of extra-thin electrical wire connector connection circuits connected to the extra-thin electrical wire connector, and the plurality of extra-thin electrical wire connector connection circuits include the extra-thin electrical wire having the conductor cross-sectional area of 0.13 sq or less as the extra-thinnest electrical wire having the smallest conductor cross-sectional area.

<Specific Example of Wiring System>

Figure 4:
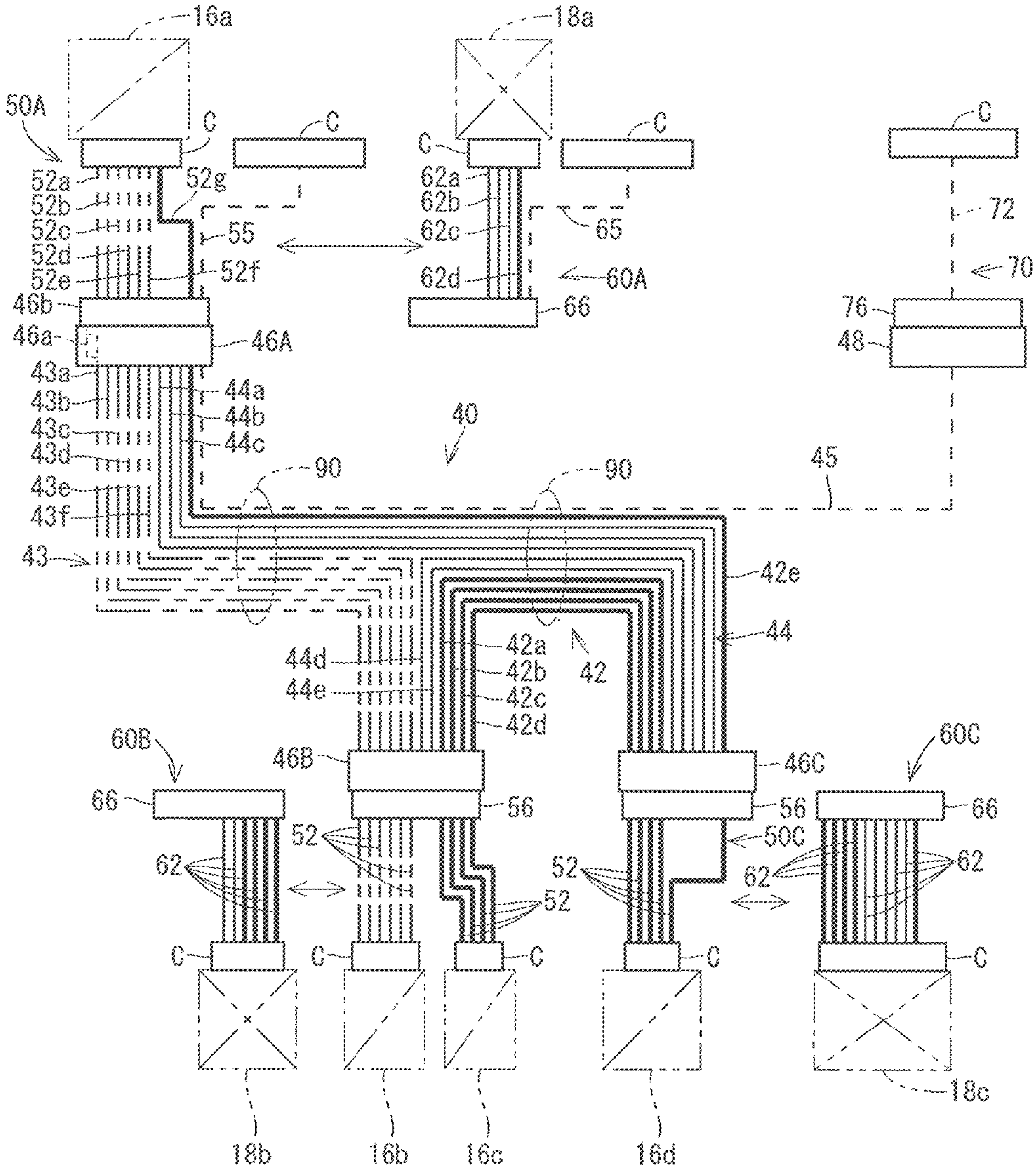
FIG. 4 is an explanation view illustrating an example of a wiring system dedicated to a second equipment specification.

One specific example of the wiring system 30 is described with reference to FIG. 4 based on a premise of the wiring system 30 described in FIG. 3. The circuit and the connector, for example, are distinguished and described in FIG. 4, however, the number of the circuits, the route of the circuit, and the number of the connectors are examples, thus can be changed in accordance with a system and specification to be applied. Each circuit is distinguished by a solid line, a thick line, a dotted line, and a dash-double-dot line, for example, in FIG. 4 for convenience of description.

The multipurpose wiring member 40 includes at least one (for example, five) multipurpose circuit 42. The plurality of multipurpose circuits 42 are distinguished into the multipurpose circuits 42*a*, 42*b*, 42*c*, 42*d*, and 42*e* hereinafter as necessary.

The multipurpose wiring member 40 includes at least one (for example, six) main wire-side first purpose circuit 43. The plurality of main wire-side first purpose circuits 43 are distinguished into main wire-side first purpose circuits 43*a*, 43*b*, 43*c*, 43*d*, 43*e*, and 43*f* hereinafter as necessary.

The multipurpose wiring member 40 includes at least one (for example, five) main wire-side second purpose circuit 44. The plurality of main wire-side second purpose circuits 44 are distinguished into main wire-side second purpose circuits 44*a*, 44*b*, 44*c*, 44*d*, and 44*e* hereinafter as necessary.

As described above, the main wire-side first purpose circuit 43 and the main wire-side second purpose circuit 44 are examples of the main wire-side circuit by use. Also assumed is a case where one of the main wire-side first purpose circuit 43 and the main wire-side second purpose circuit 44 are omitted.

The multipurpose connector 46 in the multipurpose wiring member 40 is distinguished into the multipurpose connectors 46A, 46B, and 46C in accordance with a connection destination. The multipurpose connectors 46A, 46B, and 46C and the common connector 48 include a plurality of connector terminals 46*a* (some of them are illustrated in FIG. 4) and a connector housing 46*b*, for example. Each end portion of the multipurpose circuit 42, the main wire-side first purpose circuit 43, and the main wire-side second purpose circuit 44 is connected to any connector terminal 46*a* in the multipurpose connectors 46A, 46B, and 46C and the common connector 48.

Herein, one ends of the multipurpose circuits 42*a*, 42*b*, 42*c*, and 42*d* are connected to the connector terminal in the multipurpose connector 46B, and the other ends thereof are connected to the connector terminal in the multipurpose connector 46C. One end of the multipurpose circuit 42*e* is connected to the connector terminal in the multipurpose connector 46A, and the other end thereof is connected to the connector terminal in the multipurpose connector 46C.

One ends of the main wire-side first purpose circuits 43*a*, 43*b*, 43*c*, 43*d*, 43*e*, and 43*f* are connected to the connector terminal in the multipurpose connector 46A, and the other ends thereof are connected to the connector terminal in the multipurpose connector 46B.

One ends of the main wire-side second purpose circuits 44*a*, 44*b*, and 44*c* are connected to the connector terminal in the multipurpose connector 46A, and the other ends thereof are connected to the connector terminal in the multipurpose connector 46C. One ends of the main wire-side second purpose circuits 44*d* and 44*e* are connected to the connector terminal in the multipurpose connector 46B, and the other ends thereof are connected to the connector terminal in the multipurpose connector 46C.

One end of the common circuit 45 is connected to the connector terminal in the multipurpose connector 46A, and the other end thereof is connected to the connector terminal in the common connector 48. When the plurality of circuits described above pass through the same route, the plurality of circuits may be kept in a bundled state by a banding member 90 such as an adhesive tape or a banding band, for example.

In the example of this multipurpose wiring member 40, a total number of the circuits is seventeen, and a total number of the circuits for the exclusive equipment system 14 except for the common circuit 45 is sixteen. The number of the circuits of the multipurpose circuit 42 is five. Thus, a ratio of the number of the multipurpose circuits 42 to all of the number of the circuits, that is seventeen, in the multipurpose wiring member 40 is approximately 29.41%. A ratio of the number of the multipurpose circuits 42 to the total number of the circuits, that is sixteen, for the exclusive equipment system 14 is 31.25%.

The plurality of first purpose wiring members 50 are distinguished into the first purpose wiring members 50A, 50B, and 50C. The first purpose wiring member 50A is connected to the multipurpose connector 46A, the first purpose wiring member 50B is connected to the multipurpose connector 46B, and the first purpose wiring member 50C is connected to the multipurpose connector 46C. Focusing on the first equipment specification 16, the first purpose wiring member 50A is connected to the electrical component 16*a*, the first purpose wiring member 50B is connected to the electrical components 16*b* and 16*c*, and the first purpose wiring member 50C is connected to the electrical component 16*d*.

The first purpose wiring member 50A includes at least one (for example, seven) first purpose circuit 52 and the terminal-side common circuit 55. The plurality of first purpose circuits 52 are distinguished into the first purpose circuits 52*a*, 52*b*, 52*c*, 52*d*, 52*e*, 52*f*, and 52*g*.

When the first purpose connector 56 is connected to the multipurpose connector 46A, the first purpose circuits 52*a*, 52*b*, 52*c*, 52*d*, 52*e*, and 52*f* are electrically connected to the main wire-side first purpose circuits 43*a*, 43*b*, 43*c*, 43*d*, 43*e*, and 43*f*, and the first purpose circuit 52*g* is connected to the multipurpose circuit 42*e*. Thus, the main wire-side first purpose circuits 43*a*, 43*b*, 43*c*, 43*d*, 43*e*, and 43*f* and the multipurpose circuit 42*e* are electrically connected to the electrical component 16*a* via the first purpose circuits 52*a*, 52*b*, 52*c*, 52*d*, 52*e*, 52*f*, and 52*g*.

The common circuit 45 is electrically connected to the electrical component 12*a* via the terminal side common circuit 55. The main wire-side second purpose circuits 44*a*, 44*b*, and 44*c* are opened circuits on a side of the multipurpose connector 46A.

The first purpose wiring member 50B includes at least one (for example, ten) first purpose circuit 52. The plurality of first purpose circuits 52 are branched in a midway portion away from the first purpose connector 56 to be connected to the electrical components 16*b* and 16*c*. When the first purpose connector 56 is connected to the multipurpose connector 46B, the first purpose circuit 52 is connected to the main wire-side first purpose circuits 43*a*, 43*b*, 43*c*, 43*d*, 43*e*, and 43*f* and the multipurpose circuits 42*a*, 42*b*, 42*c*, and 42*d*. Thus, the main wire-side first purpose circuits 43*a*, 43*b*, 43*c*, 43*d*, 43*e*, and 43*f* and the multipurpose circuits 42*a*, 42*b*, 42*c*, and 42*d* are electrically connected to the electrical component 16*b* or 16*c* via the first purpose circuit 52 of the first purpose wiring member 50B. In this case, the main wire-side second purpose circuits 44*d* and 44*e* are in an opened state in the multipurpose connector 46B.

The first purpose wiring member 50C includes at least one (for example, five) first purpose circuit 52. When the first purpose connector 56 is connected to the multipurpose connector 46C, the first purpose circuit 52 is connected to the multipurpose circuits 42*a*, 42*b*, 42*c*, 42*d*, and 42*e*. Thus, the multipurpose circuits 42*a*, 42*b*, 42*c*, 42*d*, and 42*e* are electrically connected to the electrical component 16*d* via the first purpose circuit 52 of the first purpose wiring member 50C. In this case, the main wire-side second purpose circuits 44*a*, 44*b*, 44*c*, 44*d*, and 44*e* are in an opened state in the multipurpose connector 46C.

The plurality of second purpose wiring members 60 are distinguished into the second purpose wiring members 60A, 60B, and 60C in the manner similar to the above description.

The second purpose wiring member 60A includes at least one (for example, three) second purpose circuit 62 and the terminal-side common circuit 65. The plurality of second purpose circuits 62 are distinguished into the second purpose circuits 62*a*, 62*b*, 62*c*, and 62*d*.

When the second purpose connector 66 is connected to the multipurpose connector 46A, the second purpose circuits 62*a*, 62*b*, and 62*c* are electrically connected to the main wire-side second purpose circuits 44*a*, 44*b*, and 44*c*, and the second purpose circuit 62*d* is connected to the multipurpose circuit 42*e*. Thus, the main wire-side second purpose circuits 44*a*, 44*b*, and 44*c* and the multipurpose circuit 42*e* are electrically connected to the electrical component 18*a* via the second purpose circuits 62*a*, 62*b*, 62*c*, and 62*d*.

In the manner similar to the case of selecting the first purpose wiring member 50A, the common circuit 45 is electrically connected to the electrical component 12*a* via the terminal-side common circuit 65. Differing from the case of selecting the first purpose wiring member 50A, the main wire-side first purpose circuits 43*a*, 43*b*, 43*c*, 43*d*, 43*e*, and 43*f* are in an opened state in a side of the multipurpose connector 46A.

The second purpose wiring member 60B includes at least one (for example, six) second purpose circuit 62. When the second purpose connector 66 is connected to the multipurpose connector 46B, the second purpose circuit 62 is connected to the main wire-side second purpose circuits 44*d* and 44*e* and the multipurpose circuits 42*a*, 42*b*, 42*c*, and 42*d*. Thus, the main wire-side second purpose circuits 44*d* and 44*e* and the multipurpose circuits 42*a*, 42*b*, 42*c*, and 42*d* are electrically connected to the electrical component 18*b* via the second purpose circuits 62 of the second purpose wiring member 60B. In this case, the main wire-side first purpose circuits 43*a*, 43*b*, 43*c*, 43*d*, 43*e*, and 43*f* are in an opened state in the multipurpose connector 46B.

The second purpose wiring member 60C includes at least one (for example, ten) second purpose circuit 62. When the second purpose connector 66 is connected to the multipurpose connector 46C, the second purpose circuit 62 is connected to the multipurpose circuits 42*a*, 42*b*, 42*c*, 42*d*, and 42*e* and the main wire-side second purpose circuits 44*a*, 44*b*, 44*c*, 44*d*, and 44*e*. Thus, the multipurpose circuits 42*a*, 42*b*, 42*c*, 42*d*, and 42*e* and the main wire-side second purpose circuits 44*a*, 44*b*, 44*c*, 44*d*, and 44*e* are electrically connected to the electrical component 18*c* via the second purpose circuit 62 of the second purpose wiring member 60C.

When the wiring system 30 is applied to the first equipment specification 16, the first purpose wiring members 50A, 50B, and 50C are selected. In this case, the multipurpose circuit 42 and the main wire-side first purpose circuit 43 in the multipurpose wiring member 40 are used, and the main wire-side second purpose circuit 44 is not used while being in the opened state in each connector.

When the wiring system 30 is applied to the second equipment specification 18, the second purpose wiring members 60A, 60B, and 60C are selected. In this case, the multipurpose circuit 42 and the main wire-side second purpose circuit 44 in the multipurpose wiring member 40 are used, and the main wire-side first purpose circuit 43 is not used while being in the opened state in each connector.

In any case, the multipurpose circuit 42 is used. That is to say, the multipurpose circuit is used as a circuit for the plurality of specifications. The multipurpose circuit is used as the multipurpose circuit in common between the plurality of specifications, thus the number of the circuits can be reduced as the wiring member for the plurality of specifications.

Considered in the present embodiment 2 is that at least one of the multipurpose circuit 42, the main wire-side first purpose circuit 43, the main wire-side second purpose circuit 44, and/or the common circuit 45 includes the extra-thin electrical wire having the conductor cross-sectional area of 0.13 sq or less as the extra-thinnest electrical wire having the smallest conductor cross-sectional area. For example, a signal circuit in the multipurpose circuit 42, the main wire-side first purpose circuit 43, the main wire-side second purpose circuit 44, and the common circuit 45 may be an extra-thinnest electrical wire. Only some or all of the circuits in the multipurpose circuits 42 may be the extra-thinnest electrical wire, for example. Only some or all of the circuits in the main wire-side first purpose circuit 43 and the main wire-side second purpose circuit 44 may be the extra-thinnest electrical wire, for example.

All or some of the plurality of multipurpose connectors 46A, 46B, and 46C may be the extra-thin electrical wire connectors depending on an embodiment of applying the extra-thinnest electrical wire to the circuit. For example, when only the main wire-side first purpose circuit 43 is the extra-thinnest electrical wire, the multipurpose connectors 46A and 46B are the extra-thin electrical wire connectors, and the multipurpose connector 46C is not the extra-thin electrical wire connector. For example, when the multipurpose circuit 42 is the extra-thinnest electrical wire, all of the multipurpose connectors 46A, 46B, and 46C are the extra-thinnest electrical wire connectors.

Example for Comparison

Figure 5:
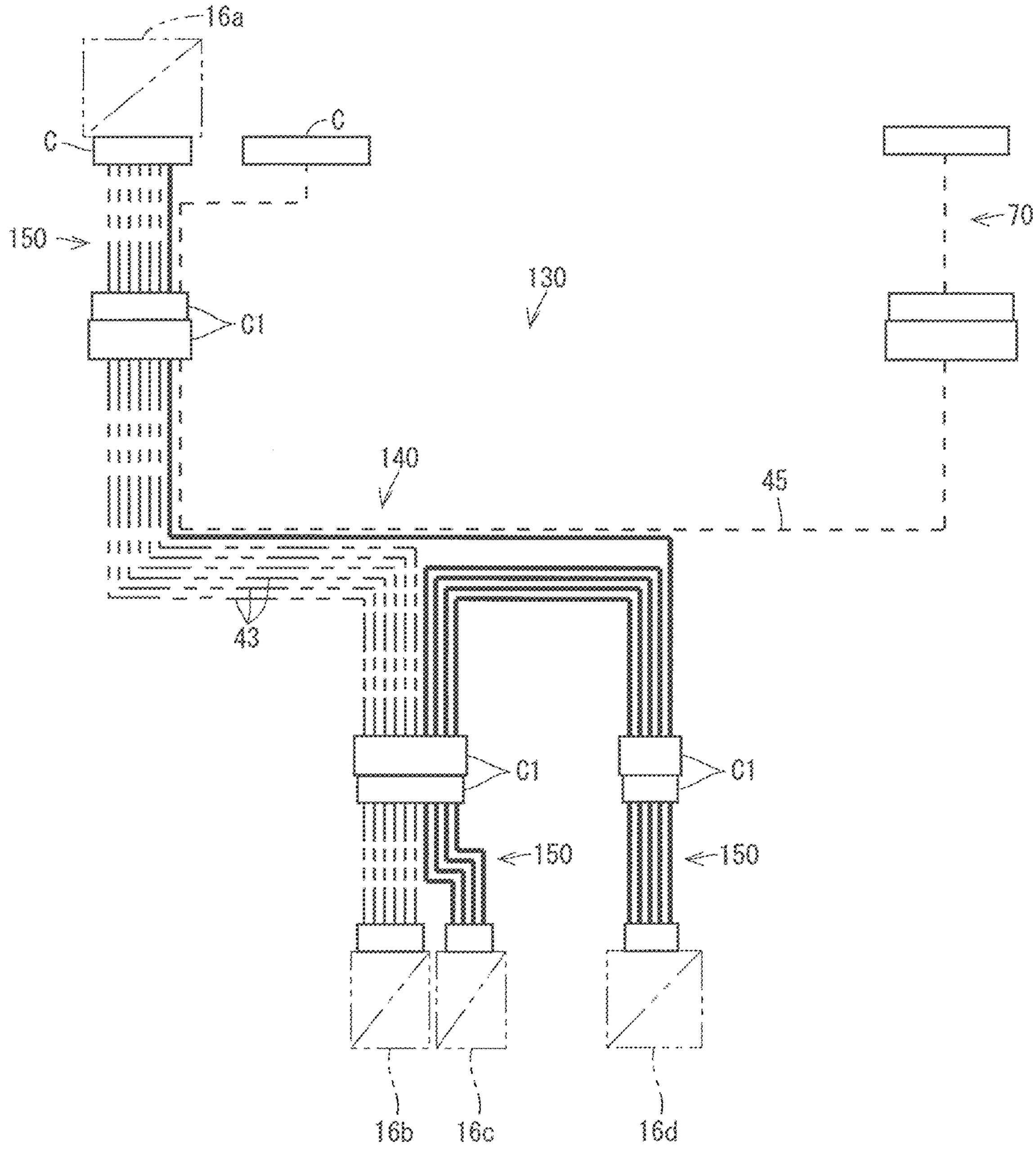
FIG. 5 is an explanation view illustrating an example of a wiring system dedicated to a first equipment specification.

A case where the multipurpose circuit is not used is assumed for comparison. FIG. 5 illustrates a wiring system 130 dedicated to the first equipment specification 16 as a first example. In this case, a main wire-side wiring member 140 is assumed to have a configuration that the main wire-side second purpose circuit 44 is omitted in the multipurpose wiring member 40 in the wiring system 30 described above. In a connector of the main wire-side wiring member 140 and a first purpose wiring member 150 corresponding to the first purpose wiring member 50, a connector C1 with a size including connector terminals whose number corresponds to the number of the reduced circuits is assumed to be used. A total number of the circuits of the present main wire-side wiring member 140 is twelve, and a total number of the circuits according to the exclusive equipment system is eleven.

Figure 6:
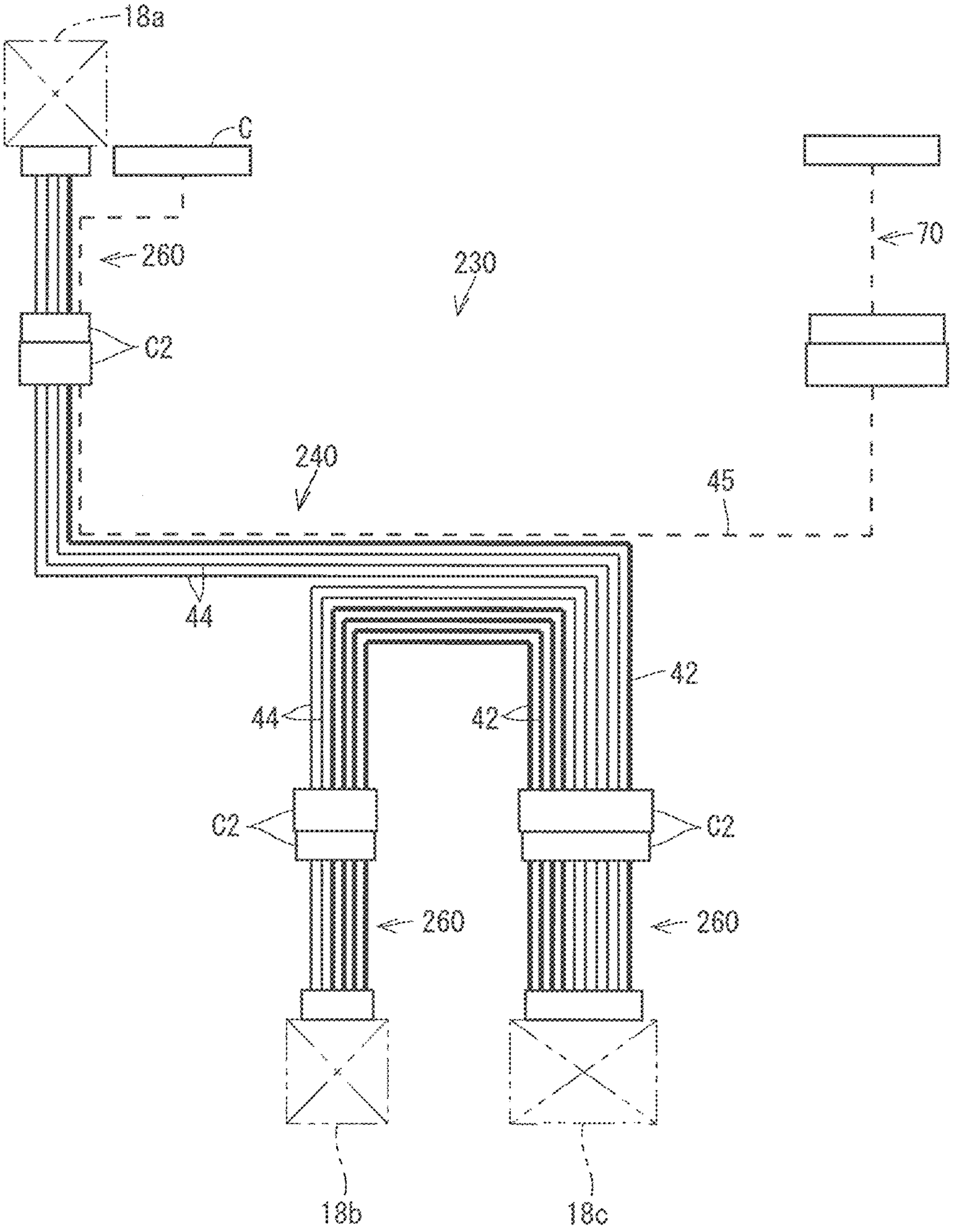
FIG. 6 is an explanation view illustrating an example of a wiring system dedicated to the second equipment specification.

FIG. 6 illustrates a wiring system 230 dedicated to the second equipment specification 18 as a second example. In this case, a main wire-side wiring member 240 is assumed to have a configuration that the main wire-side first purpose circuit 43 is omitted in the multipurpose wiring member 40 in the wiring system 30 described above. In a connector of the main wire-side wiring member 240 and a second purpose wiring member 260 corresponding to the second purpose wiring member 60, a connector C2 with a size including connector terminals whose number corresponds to the number of the reduced circuits is assumed to be used. A total number of the circuits of the present main wire-side wiring member 240 is eleven, and a total number of the circuits according to the exclusive equipment system is ten.

When the main wire-side wiring members 140 and 240 are separately prepared in the first equipment specification 16 and the second equipment specification 18, a management part number of the wiring member and a stock thereof to be managed increase. In order to deal with both specifications of the first equipment specification 16 and the second equipment specification 18, when the main wire-side wiring members 140 and 240 are simply integrated with each other, the number of the circuits increases too much. For example, when the main wire-side wiring members 140 and 240 are simply integrated with each other, the number of the circuits becomes twenty-two by subtracting the number of the circuits for the common circuit 45 from a simple sum of the total number of the circuits. The total number of the circuits after integration is twenty-one in consideration of only the circuit according to the exclusive equipment system.

In the meanwhile, the multipurpose circuit 42 is used for both the first equipment specification 16 and the second equipment specification 18 in the present wiring system 30. A difference of a length, route, connection configuration of the circuit caused by a difference of types of the electrical components 16*a*, 16*b*, 16*c*, and 16*d* of the first equipment specification 16 and the electrical components 16*a*, 16*b*, and 16*c* of the second equipment specification 18 is resolved by the first purpose wiring member 50 or the second purpose wiring member 60. The number of the circuits can be reduced by reason that the multipurpose circuit 42 is used. In the example illustrated in FIG. 4, the multipurpose wiring member 40 includes five multipurpose circuits 42, thus five circuits are reduced compared with the case where the main wire-side wiring members 140 and 240 are simply integrated with each other.

As a ratio of the number of the multipurpose circuits 42 to the total number of the circuits in the multipurpose wiring member 40 gets larger, the effect of reducing the number of the circuits increases. For example, a ratio of the number of the multipurpose circuits to all of the number of circuits in the multipurpose wiring member 40 may be equal to or larger than 10%. The ratio of the number of the multipurpose circuits to the total number of the circuits in the multipurpose wiring member 40 is preferably equal to or larger 15%, more preferably equal to or larger than 20%, further more preferably equal to or larger than 25%, and still further more preferably equal to or larger than 30%.

In the similar manner, the ratio of the number of the multipurpose circuits 42 to the total number of circuits for the exclusive equipment system 14 in the multipurpose wiring member 40 may also be equal to or larger than 10%, preferably equal to or larger 15%, more preferably equal to or larger than 20%, further more preferably equal to or larger than 25%, and still further more preferably equal to or larger than 30%.

The circuit in the main wire-side wiring members 140 and 240 may include an extra-thin electrical wire having a conductor cross-sectional area of 0.13 sq or less as an extra-thinnest electrical wire having a smallest conductor cross-sectional area.

<Example of Connection Destination of Multipurpose Circuit>

Figure 7:
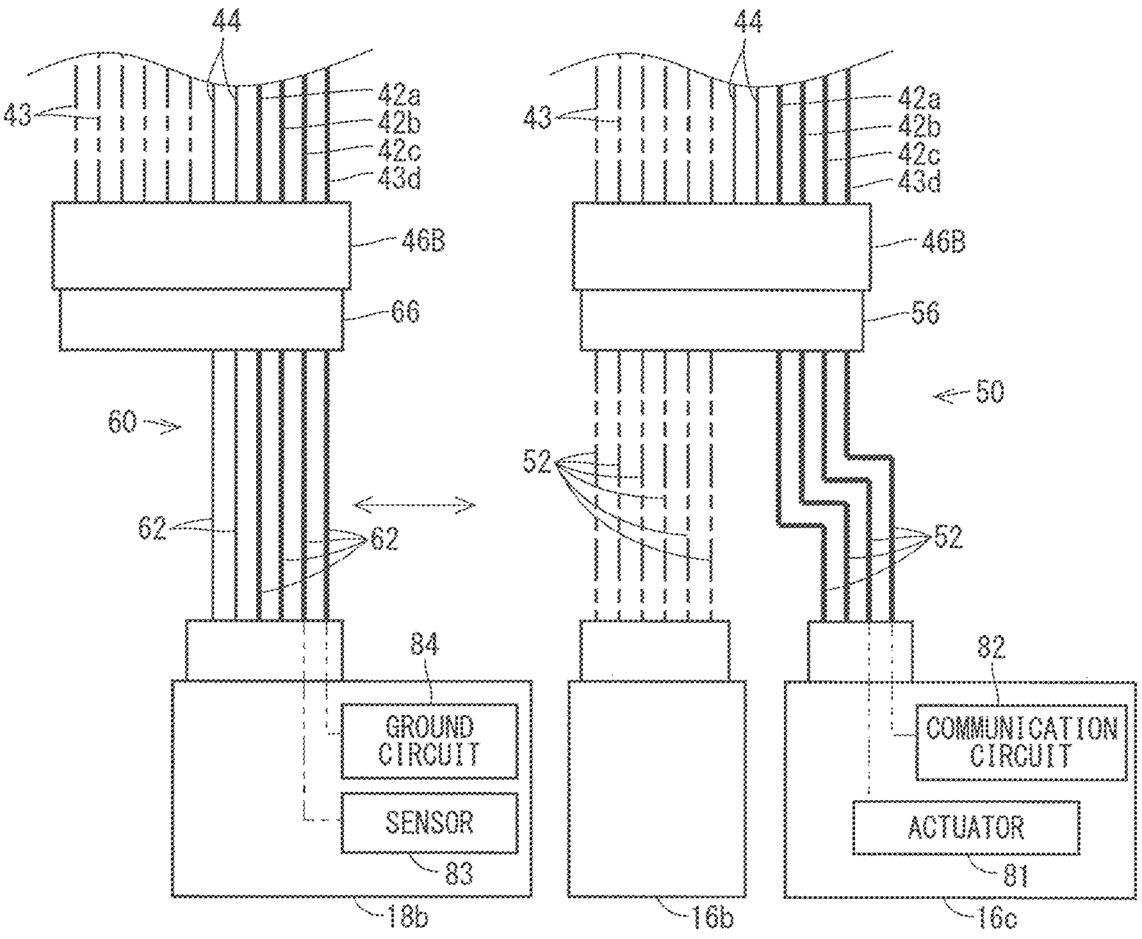
FIG. 7 is an explanation view illustrating an example of a connection destination part of a multipurpose circuit.

FIG. 7 is an explanation view illustrating an example of a connection destination of the multipurpose circuit 42. FIG. 7 illustrates an example of the multipurpose circuits 42*a*, 42*b*, 42*c*, and 42*d* connected to the electrical component 16*c* via the first purpose wiring member 50 and an example thereof connected to the electrical component 18*b* via the second purpose wiring member 60.

As illustrated in FIG. 7, the multipurpose circuit 42 includes the circuits 42*c* and 42*d* transmitting different types of electricity between a state where the first purpose connector 56 is connected to the multipurpose connector 46B and a state where the second purpose connector 66 is connected to the multipurpose connector 46B.

The circuit transmitting the different types of electricity is a circuit in which voltage to be applied, a maximum current value to be assumed, or a signal form is different between the first equipment specification 16 and the second equipment specification 18, for example.

The multipurpose connector 46 may include the circuits 42*c* and 42*d* transmitting different types of electricity for any of a power source, a ground, and a signal between a state where the first purpose connector 56 is connected to the multipurpose connector 46B and a state where the second purpose connector 66 is connected to the multipurpose connector 46B.

In the example illustrated in FIG. 7, when the first purpose connector 56 of the first purpose wiring member 50 is connected to the multipurpose connector 46B, the multipurpose circuit 42*c* is connected to an actuator 81 to serve as a circuit for supplying a power source electricity of the actuator 81. In the meanwhile, when the second purpose connector 66 of the second purpose wiring member 60 is connected to the multipurpose connector 46B, the multipurpose circuit 42*c* is connected to a sensor 83 to serve as a circuit for transmitting a detection signal.

When the first purpose connector 56 of the first purpose wiring member 50 is connected to the multipurpose connector 46B, the multipurpose circuit 42*d* is connected to a communication circuit 82 to serve as a circuit for transmitting a communication signal. In the meanwhile, when the second purpose connector 66 of the second purpose wiring member 60 is connected to the multipurpose connector 46B, the multipurpose circuit 42*d* is connected to a ground circuit 84 to serve as a circuit transmitting electricity for a ground.

A size of a cross section of the multipurpose circuit 42 is not particularly limited. For example, when the multipurpose circuit 42 is a core wire of an electrical wire, a cross-sectional area of the core wire may be classified into any of 0.13 sq, 0.35 sq, 0.5 sq, and 2 sq. A unit sq is a standard regarding a cross-sectional area of a core wire regulated by JIS standard, and indicates square millimeter. The multipurpose circuit 42 can be used for transmitting each type of electricity within a range of current allowed in accordance with a cross-sectional area and material of the circuit, for example.

The extra-thinnest electrical wire is preferably applied to a circuit for transmitting a signal in a case where any of the first purpose wiring member 50 and the second purpose wiring member 60 is connected, however, this configuration is not necessary.

<Effect Etc>

According to the wiring system 30 having the above configuration, the effect similar to that in the embodiment 1 described above can be obtained.

According to the present wiring system 30, the multipurpose circuit 42 is connected to both the first purpose circuit 52 and the second purpose circuit 62. Thus, a total number of circuits can be reduced compared with a case where a circuit connected to the first purpose circuit 52 and a circuit connected to the second purpose circuit 62 are separately prepared for the main wire-side wiring member. Accordingly, it is possible to easily deal with the plurality of specifications of vehicles while the number of the circuits is reduced.

The main wire-side circuit includes the multipurpose circuit 42 and the main wire-side circuit by use based on a premise of the multipurpose wiring member 40 having such advantages. Thus, the number of circuits in the multipurpose wiring member 40 is assumed to be larger than at least one of the number of circuits of the wiring system 130 dedicated to the first equipment specification and/or the number of circuits of the wiring system 230 dedicated to the second equipment specification. Thus, the tensile force on the extra-thinnest electrical wire can be received by a larger number of circuits in a case where the extra-thinnest electrical wire is connected to the multipurpose connector 46 as the extra-thinnest electrical wire connector.

At least one of the circuits connected to the multipurpose connector 46 is in the opened state while the first purpose connector 56 or the second purpose connector 66 as the terminal-side connector is connected to the multipurpose connector 46 as the extra-thin electrical wire connector. When the first purpose connector 56 is connected to the multipurpose connector 46 described above, the main wire-side second purpose circuit 44 is kept in the opened state, for example. When the second purpose connector 66 is connected to the multipurpose connector 46 described above, the main wire-side first purpose circuit 43 is kept in the opened state, for example. The opened circuit is not used for connection to the other electrical component. The opened circuit may be the extra-thin electrical wire or the extra-thinnest electrical wire, and is also assumed to be an electrical wire thicker than the extra-thin electrical wire. The tensile force on the extra-thinnest electrical wire can be diffused using the electrical wire applied to the opened circuit.

[Modification Example]

Each configuration described in the embodiments and modification examples thereof can be appropriately combined as long as they are not contradictory.

EXPLANATION OF REFERENCE SIGNS

1, 30, 130, 230 wiring system
2, 140, 240 main wire-side wiring member
3 main wire-side circuit
3B, 90, 490 banding member
3Ea, 3Eb, 3Ec connection end
3M main wire
3T, 7T, 46*a* connector terminal
3*a* extra-thinnest electrical wire
3*b* electrical wire
3*p*, 7*p* core wire
3*q*, 7*q* covering
4*a*, 4*b*, 4*c* main wire-side connector
5*a*, 5*b*, 5*c* terminal-side wiring member
6*a*, 6*b*, 6*c* terminal-side connector
7 terminal-side circuit
9A, 9B, 9C, 9D, 9E, 12*a*, 12*b* electrical component
11 vehicle
12 common equipment system
14 exclusive equipment system
16 first equipment specification
16*a*, 16*b*, 16*c*, 16*d* first electrical component
18 second equipment specification
18*a*, 18*b*, 18*c* second electrical component
40 multipurpose wiring member
42 (42*a*, 42*b*, 42*c*, 42*d*, 42*e*) multipurpose circuit
43, (43*a*, 43*b*, 43*c*, 43*d*, 43*c*, 43*f*) main wire-side first purpose circuit
44 (44*a*, 44*b*, 44*c*, 44*d*, 44*e*) main wire-side second purpose circuit
45 common circuit
46 (46A, 46B, 46C) multipurpose connector
46*b* connector housing
48 common connector
50 (50A, 50B, 50C), 150 first purpose wiring member
52 (52*a*, 52*b*, 52*c*, 52*d*, 52*e*, 52*f*, 52*g*) first purpose circuit
55 terminal-side common circuit
56 first purpose connector
60 (60A, 60B, 60C), 260 second purpose wiring member
62 (62*a*, 62*b*, 62*c*, 62*d*) second purpose circuit
65 terminal-side common circuit
66 second purpose connector
70 terminal-side common wiring member
72 circuit
81 actuator
82 communication circuit
83 sensor
84 ground circuit
C, C1, C2, 76 connector
R reinforcement

The invention claimed is:

1. A wiring system, comprising:

a main wire-side wiring member including a plurality of main wire-side circuits and a plurality of main wire-side connectors, the plurality of main wire-side circuits bundled in a form with a plurality of connection ends, and the plurality of main wire-side connectors connected to the plurality of connection ends, respectively; and a terminal-side wiring member including a terminal-side connector connected to any one of the plurality of main wire-side connectors and at least one terminal-side circuit connected to the terminal-side connector, the terminal-side connector connected to any one of the plurality of main wire-side connectors so that the terminal-side circuit is electrically connected to at least some of the plurality of main wire-side circuits, wherein the plurality of main wire-side connectors include an extra-thin electrical wire connector, the plurality of main wire-side circuits include a plurality of extra-thin electrical wire connector connection circuits connected to the extra-thin electrical wire connector, the plurality of extra-thin electrical wire connector connection circuits include at least one extra-thin electrical wire having a conductor cross-sectional area of 0.13 square mm or less as an extra-thinnest electrical wire having a smallest conductor cross-sectional area, the terminal-side circuit includes a relative thick electrical wire having a conductor cross-sectional area larger than a conductor cross-sectional area of the extra-thinnest electrical wire, the extra-thinnest electrical wire is connected to the relative thick electrical wire by connection of the terminal-side connector to the extra-thin electrical wire connector, and the plurality of main wire-side circuits include a relative thick electrical wire having a conductor cross-sectional area larger than a conductor cross-sectional area of the extra-thinnest electrical wire.

2. The wiring system according to claim 1, wherein the plurality of main wire-side circuits include a multipurpose circuit and a main wire-side circuit by use, and the wiring system exclusively includes as the terminal-side wiring member;

the terminal-side connector is one of a first purpose connector and a second purpose connector;

a first purpose wiring member including the first purpose connector and a first purpose circuit as the terminal-side circuit; and a second purpose wiring member including the second purpose connector and a second purpose circuit as the terminal-side circuit, when the first purpose connector is connected to the extra-thin electrical wire connector, the multipurpose circuit is connected to the first purpose circuit, and when the second purpose connector is connected to the extra-thin electrical wire connector, the multipurpose circuit is connected to the second purpose circuit, and when the main wire-side circuit by use is connected to the first purpose circuit when the first purpose connector is connected to the extra-thin electrical wire connector, or is connected to the second purpose circuit when the second purpose connector is connected to the extra-thin electrical wire connector.

3. The wiring system according to claim 1, wherein at least one of the plurality of main wire-side circuits connected to the extra-thin electrical wire connector is in an opened state while the terminal-side connector is connected to the extra-thin electrical wire connector.

4. The wiring system according to claim 1, wherein the extra-thinnest electrical wire is an extra-thin electrical wire having a conductor cross-sectional area of 0.08 square mm or less.

5. The wiring system according to claim 1, wherein the terminal-side wiring member includes the plurality of terminal-side circuits, and the plurality of terminal-side circuits are branched to a plurality of circuits from the terminal-side connector to be connected to a plurality of electrical components while the terminal-side connector is connected to the extra-thin electrical wire connector.

6. The wiring system according to claim 1, wherein a ratio of a total number of the extra-thin electrical wires having a conductor cross-sectional area of 0.13 square mm or less to a total number of the plurality of main wire-side circuits is equal to or larger than 40%.

* * * * *